(12) United States Patent
Moore

(10) Patent No.: US 10,030,389 B2
(45) Date of Patent: Jul. 24, 2018

(54) PRE-FORMED INSERT BODY

(71) Applicant: Brian Leonard Moore, Remuera (NZ)

(72) Inventor: Brian Leonard Moore, Remuera (NZ)

(*) Notice: Subject to any disclaimer, the term of this patent is extended or adjusted under 35 U.S.C. 154(b) by 0 days.

(21) Appl. No.: 14/912,504

(22) PCT Filed: Aug. 20, 2014

(86) PCT No.: PCT/NZ2014/000171
§ 371 (c)(1),
(2) Date: Feb. 17, 2016

(87) PCT Pub. No.: WO2015/026244
PCT Pub. Date: Feb. 26, 2015

(65) Prior Publication Data
US 2016/0201325 A1 Jul. 14, 2016

(30) Foreign Application Priority Data
Aug. 20, 2013 (NZ) .......... 614523

(51) Int. Cl.
E04C 2/52 (2006.01)
E04B 1/94 (2006.01)
(Continued)

(52) U.S. Cl.
CPC .......... E04C 2/52 (2013.01); E04B 1/947 (2013.01); E04C 2/288 (2013.01); E04C 2/30 (2013.01); E04C 2/521 (2013.01); E04F 13/06 (2013.01); E04F 17/08 (2013.01); F16L 5/00 (2013.01); E04F 13/074 (2013.01)

(58) Field of Classification Search
CPC .... E04C 2/52; E04C 2/521; F16L 5/00; E04F 17/08; E04F 13/074
USPC .................. 52/98–100, 219, 220.8; 285/2, 4, 285/213–215
See application file for complete search history.

(56) References Cited

U.S. PATENT DOCUMENTS 4,795,197 A * 1/1989 Kaminski .......... F16L 25/0045
  285/12
5,036,636 A * 8/1991 Hasty .................. E04D 13/1476
  285/4

(Continued)

FOREIGN PATENT DOCUMENTS

EP 1489713 B1 6/2009
FR 2323255 A2 4/1977

Primary Examiner — Brian E Glessner
Assistant Examiner — Adam G Barlow
(74) Attorney, Agent, or Firm — Foley & Lardner LLP

(57) ABSTRACT

An insert body used in an existing aperture within a building panel, the body defining an aperture with geometry varied relative to the existing aperture, and comprising an inner surface, an outer surface, a front face and a rear face. The inner surface provides an inner side wall of the aperture to be formed, the outer surface provides for an outer side wall of the aperture to be formed and/or of the existing aperture to be varied. The outer side wall in use is located adjacent to the existing aperture side wall. The rear face provides a support surface for location upon the second face of the panel. The inner side wall terminates in at least one rim on the front face. The front face comprises at least one recessed region and each rim having a surface projected from the recessed region as a reference relative to the first face.

34 Claims, 14 Drawing Sheets

(51) Int. Cl.
    *E04C 2/288*     (2006.01)
    *E04C 2/30*     (2006.01)
    *E04F 17/08*     (2006.01)
    *E04F 13/06*     (2006.01)
    *F16L 5/00*     (2006.01)
    *E04F 13/074*     (2006.01)

(56) References Cited

U.S. PATENT DOCUMENTS

| | | | | |
|---|---|---|---|---|
| 5,222,334 | A * | 6/1993 | Hasty | E04D 13/1476 |
| | | | | 285/4 |
| D405,166 | S * | 2/1999 | Gavin | D23/269 |
| 5,950,277 | A | 9/1999 | Tallmadge et al. | |
| 6,264,412 | B1 | 7/2001 | Nakamura et al. | |
| 8,484,914 | B2 * | 7/2013 | Cline | E04D 13/1476 |
| | | | | 52/219 |
| 8,608,206 | B2 * | 12/2013 | Fedale, Sr. | E04D 13/1407 |
| | | | | 277/636 |
| 8,689,503 | B2 * | 4/2014 | Fischer | E04G 15/061 |
| | | | | 52/220.8 |
| 8,839,594 | B2 * | 9/2014 | Smith | H02G 3/083 |
| | | | | 174/50 |
| D785,768 | S * | 5/2017 | Haynes | D23/269 |
| 2004/0168398 | A1 * | 9/2004 | Sakno | F16L 5/04 |
| | | | | 52/741.4 |
| 2008/0088128 | A1 * | 4/2008 | Staskal | E03C 1/122 |
| | | | | 285/230 |
| 2016/0153589 | A1 * | 6/2016 | Schwinning | F16L 5/02 |
| | | | | 52/220.8 |

\* cited by examiner

PRE-FORMED INSERT BODY

CROSS-REFERENCE TO RELATED APPLICATIONS

This Application claims the benefit of priority to international patent application number PCT/NZ2014/000171, having a filing date of Aug. 20, 2014, which claims the benefit of priority to New Zealand patent application number 614523, having a filing date of Aug. 20, 2013, the complete disclosures of which are hereby incorporated by reference for all purposes.

FIELD OF THE INVENTION

The present invention relates to an insert for altering the shape or size of an existing aperture through a panel, more particularly, though not solely, to a pre-form to be used as an insert into an existing aperture through a building panel.

BACKGROUND TO THE INVENTION

Various solutions have been proposed for reducing the size of an aperture through a panel, such as a ceiling or wall panel. In particular, problems exist where for example an existing aperture of a certain size has been made to accommodate, say a lighting fixture or a conduit to pass through the panel, but then that fixture or conduit is to be replaced with a smaller size which no longer needs the existing aperture size.

Indeed, where the aperture size for the replacement fixture or conduit or any other such device extending through an aperture is smaller than the existing aperture, there becomes a problem as to how to adequately reduce the aperture whilst also ameliorating the gap between the existing aperture side wall and the size of the device to extending through the panel.

Typically an existing aperture may be in-filled by using a piece or pieces of the same (or different) panel material. However, the jointed region between such in-fill materials and the panel itself may be weak or may weaken of fail over time. For example, where there is an existing circular aperture through a ceiling panel and that existing aperture is to be reduced in size, an annular ring of material may be cut to be inserted into the existing aperture to provide the new aperture size. The joint between the outer surface of the annular ring and the panel may be connected to each other using joint tapes and layers of concealing material (e.g. plaster). However such a solution still presents problems as the joint region may fail or weaken, leading to problems of cracked concealing material (plaster) or other finishing materials (e.g. paints).

It is therefore an object of the present invention to provide for altering the shape or size of an existing aperture through a panel and/or which will go at least some way towards addressing the foregoing problems or which will at least provide the public with a useful choice.

In this specification where reference has been made to patent specifications, other external documents, or other sources of information, this is generally for the purpose of providing a context for discussing the features of the invention. Unless specifically stated otherwise, reference to such external documents is not to be construed as an admission that such documents, or such sources of information, in any jurisdiction, are prior art, or form part of the common general knowledge in the art.

Further aspects and advantages of the present invention will become apparent from the ensuing description which is given by way of example only.

SUMMARY OF THE INVENTION

In a first aspect, the present invention may broadly consist in a body defining an aperture to be formed in a panel, the body comprising:
  an inner surface,
  an outer surface,
  a front face, and
  a rear face,
  wherein the inner surface provides an inner side wall of the aperture to be formed, the aperture to be formed being of a reduced size relative to an existing aperture through a panel, the panel having a thickness defined between a first face and a second face, and the panel having an existing aperture side wall as defined by the existing aperture and extending between the first and second faces of the panel,
  the outer surface comprising an outer side wall of the aperture to be formed, the outer side wall to be located substantially adjacent to the existing aperture side wall,
  the rear face provides for at least one support surface to be located upon a region of the second face of the panel surrounding the existing aperture, and
  wherein the inner side wall terminates as a rim on the front face, the front face comprising a recessed region and the rim having a rim surface, the rim surface projecting from the recessed region so as to provide a reference surface, referenced relative to the first face of the panel.

In another aspect, the present invention may broadly consist in a body defining an aperture to be formed in a panel, the body comprising:
  an inner surface,
  an outer surface,
  a front face, and
  a rear face,
  the aperture to be formed being of a varied geometry (such as a reduced size or altered shape) relative to an existing aperture through a panel,
  wherein the inner surface provides for an inner side wall of the aperture to be formed, the panel having a thickness defined between a first face and a second face, and the panel having an existing aperture side wall as defined by the existing aperture and extending between the first and second faces of the panel,
  the outer surface comprising an outer side wall of the, or at least a part of the, aperture to be formed and/or of the existing aperture to be varied in geometry, the outer side wall to be, at least in part, located substantially adjacent to the existing aperture side wall,
  the rear face provides for at least one support surface to be located upon a region of the second face of the panel surrounding the existing aperture, and
wherein the inner side wall terminates with at least one rim on the front face, the front face comprising one or more recessed regions and each rim having a rim surface, the rim surface being a surface projected from at least one of the one or more recessed regions so as to provide a reference surface, referenced relative to the first face of the panel.

Preferably, the body is to be located within the existing aperture of the panel for reducing the size or altering the shape or geometry of the existing aperture.

Preferably, wherein the rim surface is substantially planar with the first face of the panel, when said rear face is located upon the second face of the panel. More preferably, the rim surface is a substantially planar surface. Even more preferably, the rim surface is a material application surface.

Preferably, wherein the recessed region is recessed relative to the rim surface.

Preferably, wherein the recessed region is a surface recessed from the first face of the panel, when said rear face is located upon the second face of the panel.

Preferably, wherein the front face comprises a plurality of associated recessed regions each having an associated rim, each rim having an associated rim surface, each of said associated rim surfaces projecting from a respective associated recessed region.

Preferably, wherein each rim surface provides for a reference surface, referenced relative to the first face of the panel.

Preferably, wherein each rim is associated at least in part with an associated inner side wall or a part of an inner side wall.

Preferably one or more of the plurality of associated recessed regions and/or the associated rim, or an associated recessed region and an associated rim, is/are separately connectable to, or disconnectable from, the body.

Preferably, a connection system is provided between a first of an associated recessed region and an associated rim and a second of an associated recessed region and an associated rim, the connection system allowing for a connection or disconnection to or from the body of one or more associated recessed regions with an associated rim or one or more associated recessed regions.

Preferably, wherein the connection system is a frangible connection provided between a first of an associated recessed region and an associated rim and a second of an associated recessed region and an associated rim, the frangible connection allowing for disconnection or removal of a recessed region and a rim from the body, Preferably, wherein the frangible connection is located between an inner side wall of the first associated recessed region with the first associated rim and the second recessed region with the second associated rim.

Preferably, the at least one frangible connection allows for a disconnection or removal of at least one associated region and associated rim from another associated region and associated rim.

Preferably the frangible connection allows for a tear out of a recessed region and an associated rim (and/or associated inner side wall).

Preferably, wherein a plurality of associated recessed regions and/or associated rim form the front face of the body.

Preferably, the connection system allows for a snap-in or snap-fit connection for connecting one or more associated recessed regions with an associated rim and an inner side wall to the body or to one or more associated recessed regions with an associated rim and an inner side wall.

Preferably, the front face comprises a series or sequence of sets of associated recessed regions and associated rims each with an associated inner side wall, whether removable from or connectable to the body, each set providing geometry (such as size or shape).

Preferably, the plurality of associated recessed regions and associated rims with associated inner side walls are concentric.

Preferably, there is a concentric series of sets of associated recessed regions and associated rims with associated inner side walls.

Preferably wherein a rim with a rim surface is gauged relative to the first face of a panel. For example, the rim can be gauged to be of a pre-determined height so that the recessed region needs to take either more or less material depending on the height of the rim projecting from the recessed region.

Preferably wherein the rim or rim surface can be sized to be of predetermined widths as necessary. For example, the rim may be of a surface area which expands toward the recessed area from the inner side wall region.

Preferably, the front face comprises a central recessed region, optionally surrounded by a rim that is associated with a different recessed region and a different side wall. More preferably, the central recessed region allows the body to be used as a plug for completely enclosing an existing aperture.

Preferably, the recessed region comprises one or more surface reliefs, such as undulations or an undulating surface. More preferably, said undulations or undulating surface provides for a material application surface.

Alternatively, the front face or other surfaces, such as the outer surface or inner surface, one or a combination of these, may be perforated or included undulations so as to provide for a surface more readily receivable or engageable of a material to be applied thereto. For example, a surface having undulations or perforated regions may provide for increased surface area upon which a material may become engaged, or the surface may be textured or otherwise surface-treated or profiled so as to have increased engagement with a material to be applied thereon or thereto. Perforations may comprises slits or slots through the front face or other surfaces, such as the outer surface or inner surface (or combinations of one or more of these), either partially formed (for example, more an as an indentation) into the material of the body, or as a complete cut-out or portion of the body which is devoid of material forming the body (for example, more as a perforation). In this manner, surfaces can be provided with various surface relief patterns or indentations or perforations for improving or providing additional surface area for a mechanical connection of any material such as plaster or adhesives or other finishing or intermediate materials to be engaged or become connected with the body.

Preferably, the recessed region is a material engaging surface.

Preferably, the front face is to receive, or have applied thereto, a material.

Preferably, the recessed region is to receive, or have applied thereto, the material.

Preferably, the rim surface is to receive, or have applied thereto, the material.

Preferably, the material is one or more of, whether as a singular or compound composition(s), in a single or multiple layers: a levelling material(s), a filling material(s), a jointing compound, a concealing material(s), a finishing material(s). More preferably, the front face is to receive sufficient material so as to be substantially level with the first face of the panel or a finished surface of the panel first face.

Preferably, wherein the rear face is or comprises at least one flanged portion extending outwardly from the outer surface. More preferably, wherein the flanged portion(s) extend(s) outwardly so as to be supported upon the region of the second face surrounding the existing aperture. Even more preferably, the region of the second face surrounding the existing aperture is an area overlapped by the at least one flanged portion. Most preferably, the area overlapped is at least a section of a perimeter of the second face about the existing aperture.

Preferably, when in-situ, the rear face located upon the second face of the panel supports the body.

Preferably, the front face is of dimensioned so as to provide a width as necessary to achieve a pre-determined alteration of the size of the existing aperture.

Preferably, the body is formed by one or more components. More preferably, each of said components is/are inter-connectable so as to form the body.

Preferably, each of the components define at least a partial section of the body, each of said components including at least one inter-connect region for connection with an adjacent component.

Preferably, a pair of components form the body. More preferably, the pair of components may each be a half of the body.

Preferably, the inter-connection is a hinged joint. More preferably, the inter-connection is a single hinged joint connecting two components that together form the body as a whole. Even more preferably, the inter-connection is two or more hinged joints connecting the components that together form the body as a whole.

Preferably, inter-connection is via a male part of one component to be received by a female part of another component. Alternatively, inter-connection is by an adhesive applied to an inter-connection region.

Preferably, wherein inter-connection is by co-location of a part of one component with a part of another component.

Preferably, the one or more components are co-locatable within the existing aperture, co-locatable for inter-connection with each other to form the body.

Preferably, wherein the inner side wall surface comprises a channel or a plurality of channels. More preferably, the channel(s) is/are shaped so as to receive a fitting or fittings of a component to be inserted or located within the aperture defined by the body. Even more preferably, the channel is to receive a lug or projection or other locating mechanism from one of: a lighting fixture, a through pipe or conduit. Most preferably, the channel is for locating a lighting fixture. In such a situation, the channel may include an entry region for a fitting, and a securement region to secure or retain a fitting.

Preferably, wherein the aperture defined by the body is selected from: circular, oval or elongated in shape, rectilinear, square, rectangular, geometric in shape.

Preferably, wherein the shape of outer surface defined by the body is selected from: circular, oval or elongated in shape, rectilinear, square, rectangular, geometric in shape.

Preferably, wherein the shape of the outer surface is different to the aperture defined by the body. For example, the outer surface may define a rectilinear shape (e.g. a square or a rectangle), whilst the aperture defined by the body may be of a circular, oval or elongated shape; or vice versa.

Preferably, wherein the body or components of the body is/are a pre-form.

Preferably, wherein the body is a casted or moulded pre-form. More preferably, the body is injection moulded or extrusion moulded. Alternatively parts or portions of the body or components may be formed or made separately and then combined with other parts or portions to form the body or components. For example, rotational moulding or centripetal or centrifugal casting may be utilised in formation of these, or the body materials in general.

Preferably, the body is formed of one of: fibrous plasters such as compositions comprising gypsum, polymers, metals, compositions comprising fibrous reinforcement, including cementitious fibre reinforced materials, fibre-glass materials, including for example cellulosic-based or cellulosic-comprising fibrous materials.

Preferably, the body is formed of a fibrous plaster compound. More preferably, is a composition comprising gypsum.

Preferably, the body is formed of a metal. More preferably, the metal is one or more of: steel, stainless steel, aluminium. In one example, metals may be centrifugally moulded so as to attain a desired shape.

Preferably, the body is formed of a polymer. More preferably, the polymer is one or more of: theromplastics, thermosetting polymers polyethylene (PE), polypropylene (PP), polyethylene terephthalate (PET), or others which have suitable characteristics as may be desired for a particular use or installation situation.

Preferably, the body is formed of, or comprises: an electrically conductive component, an anti-static component, an electrically insulating component, a fire resistant component, a fire retardant component, or may be a self-extinguishing component material.

Preferably, the panel is a building panel. More preferably, the building panel is a ceiling panel or a wall panel. Even more preferably, the building panel is a fibrous plaster comprising gypsum.

Preferably, the outer side wall of the body or the rear face, or both, comprise an adhesive for adhesively engaging with the panel. More preferably, the adhesive may include a removable backing, which upon removal exposes an adhesive for engagement with the panel. Even more preferably, removal of the backing allows for subsequent activation of the adhesive. Alternatively, the adhesive may be activated by a secondary activator, for example the adhesive may be activated by a heat or energy source. Adhesives can include pressure sensate adhesives, glues or other materials which cure to form a mechanical connection.

In a second aspect, the present invention may broadly consist in a method of reducing the size of an existing aperture through a panel by installing the body into the existing aperture, the body as defined above, the method comprising:

positioning the body as defined above within the existing aperture, securing the body into position by locating the outer side wall into an engaging position with the existing aperture side wall and the rear face into an engaging position with the panel by locating the rear face upon a region of the second face of the panel surrounding the existing aperture, concealing the joint between the body and the first face of the panel.

Preferably, an adhesive is applied to the outer side wall of the body or the rear face, or both, such that installation facilitates engaging of the applied adhesive with the panel. More preferably, the adhesive is activated to cure and adhere to the panel.

Preferably, the concealing step comprises applying a sufficient amount of one or more of the materials as defined to the front face to level the front face with the first face of the panel. More preferably, the one or more materials may then be further applied to the levelled front face to achieve a finished surface substantially commensurate with a finished surface of the first face of the panel. Even more preferably, a sufficient amount of material, such as plaster or similar materials, is applied at joint regions of the body and the building panel, allowing the plaster to settle, and then polishing the material, such as plaster or similar material, to achieve a finished surface.

Preferably, a tape, such as a jointing tape, is applied to at least joint regions between the first face of the panel and the front face.

Preferably the concealing step involves applying a sufficient amount of plaster or similar material at the joint regions of the inserts and the building panel, allowing the plaster to settle, and then polishing the plaster or similar material to achieve a smooth surface finish.

For the purposes of this specification, reference to "size" of the aperture, whether existing or that as formed by the inner surface of the body encompasses at least the area defined by the opening of the aperture at the surface of the first face of a panel.

It will be appreciated the body of this invention may also be utilised for use in altering or reducing or amending the shape or dimension of other aspects of an aperture through a panel, for example the body may provide for a greater thickness defined by the inner side wall of the body defining the aperture, compared to say the thickness of an existing aperture through a panel, where the thickness may be that of a side wall as defined by thickness between a first face and a second face of the panel.

The term "comprising" as used in this specification means "consisting at least in part of". When interpreting each statement in this specification that includes the term "comprising", features other than that or those prefaced by the term may also be present. Related terms such as "comprise" and "comprises" are to be interpreted in the same manner.

This invention may also be said broadly to consist in the parts, elements and features referred to or indicated in the specification of the application, individually or collectively, and any or all combinations of any two or more said parts, elements or features, and where specific integers are mentioned herein which have known equivalents in the art to which this invention relates, such known equivalents are deemed to be incorporated herein as if individually set forth.

The invention consists in the foregoing and also envisages constructions of which the following gives examples only.

BRIEF DESCRIPTION OF THE DRAWINGS

Preferred embodiments of the invention will be described by way of example only and with reference to the drawings, in which.

DETAILED DESCRIPTION OF PREFERRED EMBODIMENTS

This invention facilitates the alteration in the shape or size of an aperture opening through a panel, for example a building panel such as a ceiling or a wall. The following description is provided as exemplary of the invention, and is made with reference to the accompanying drawings.

This invention also provides for a relatively uncomplicated system for reducing the geometry, such as shape or size of an existing aperture, whilst as the same time provides a platform upon which materials, such as concealing compositions—e.g. plaster, paint or other fillers or finishes, may be applied to conceal the joint region between the body and the surrounding panel.

It will also be appreciated the present invention may be utilised for improving or strengthening the aperture cut or made in a building panel to receive a fitting, such as a light fitting (or any other outlet or utility requiring an aperture through a building panel) or a wall socket (such as for electrical outlets or indeed any other outlet requiring an aperture through a building panel). For example, the existing aperture referred to here may be the aperture which is initially cut or made in a building panel to then receive a fitting. The insert body of the invention is then able to be inserted into the aperture made, and the body provides for a defined geometry of a final or finished aperture.

The body of the invention facilitates an improvement in the strength of the building panel and any finishes made about the aperture so cut or made, and in this way can help to minimise possible "break-out" in which the materials used around the aperture are compromised as to their structural integrity due to forces imposed upon them, for example by a light fitting imparting a force on a building panel about the aperture. "Break out" may result in cracking of plaster or paint or other unsightly effects in decorative finishes around the aperture.

Figure 2:
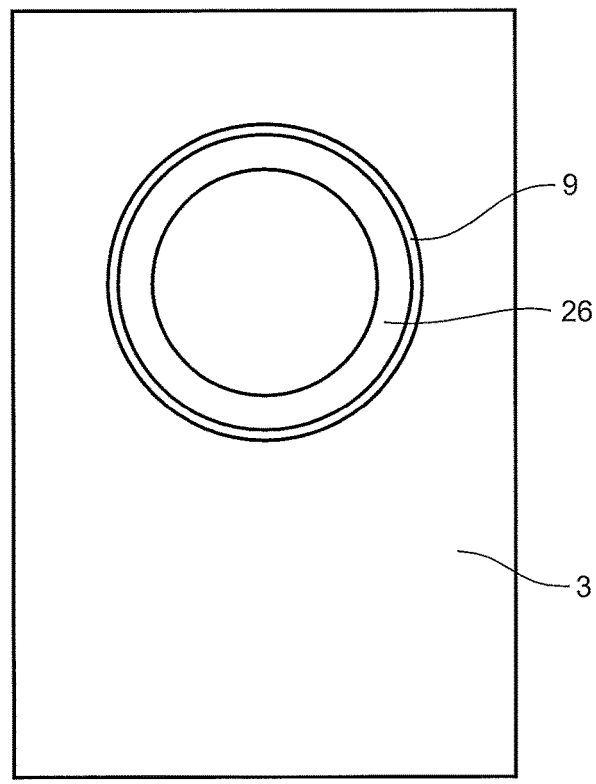
FIG. 2 is an illustration of a prior art system for reducing the size of an existing aperture through a panel.
Figure 3:
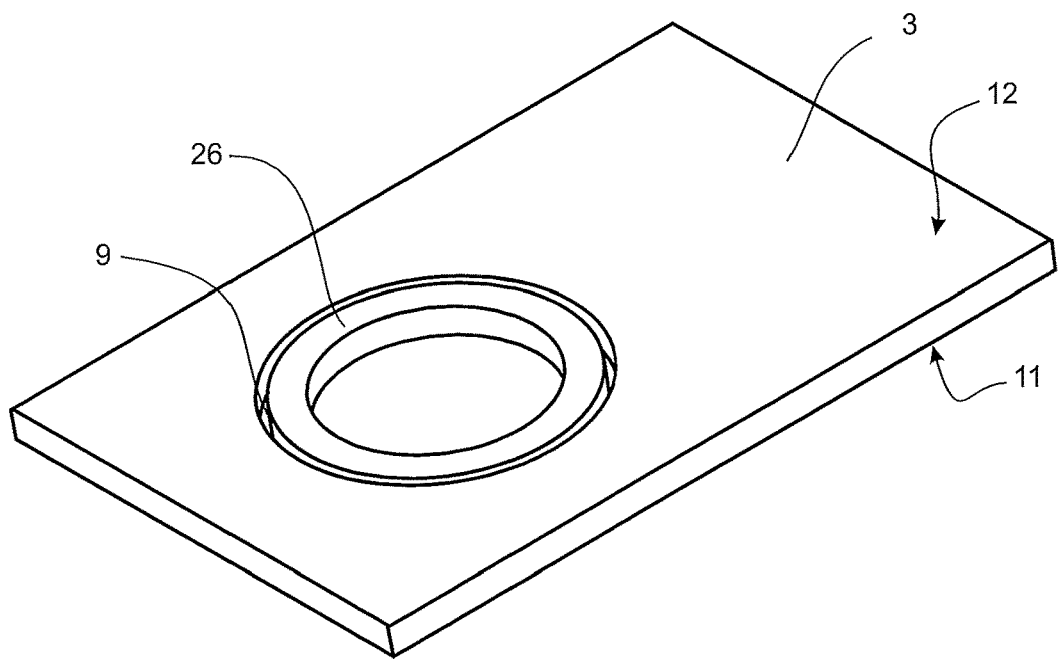
FIG. 3 is a perspective view of the FIG. 2 configuration.
Figure 4:
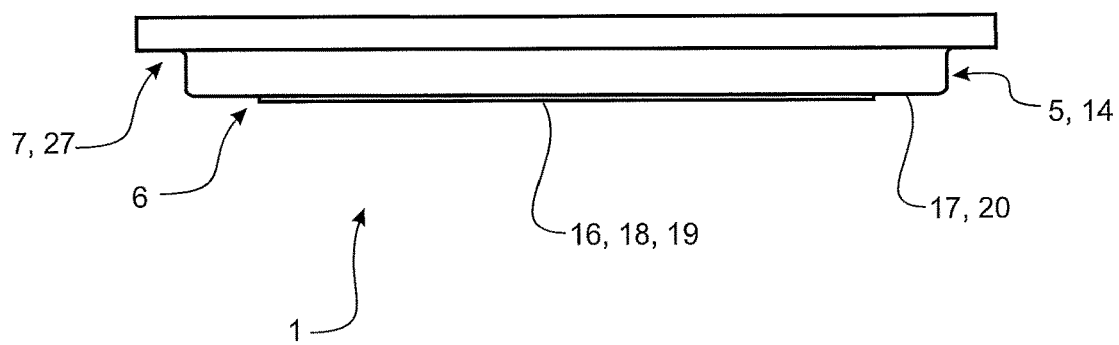
FIG. 4 is a side view of a body in one embodiment of the invention.
Figure 5:
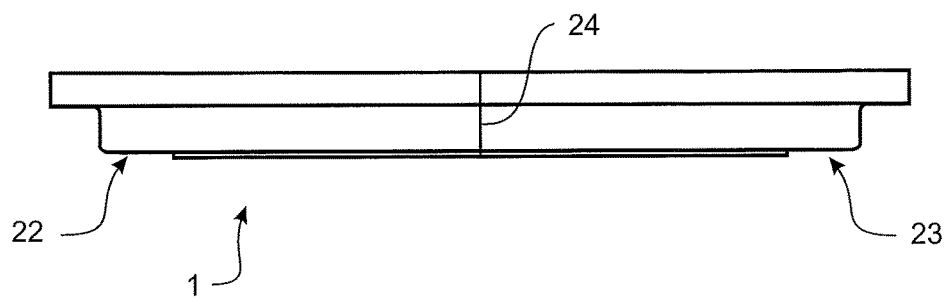
FIG. 5 is an example of a body formed by inter-connection of two components for forming the body according to another embodiment of the invention.
Figure 6:
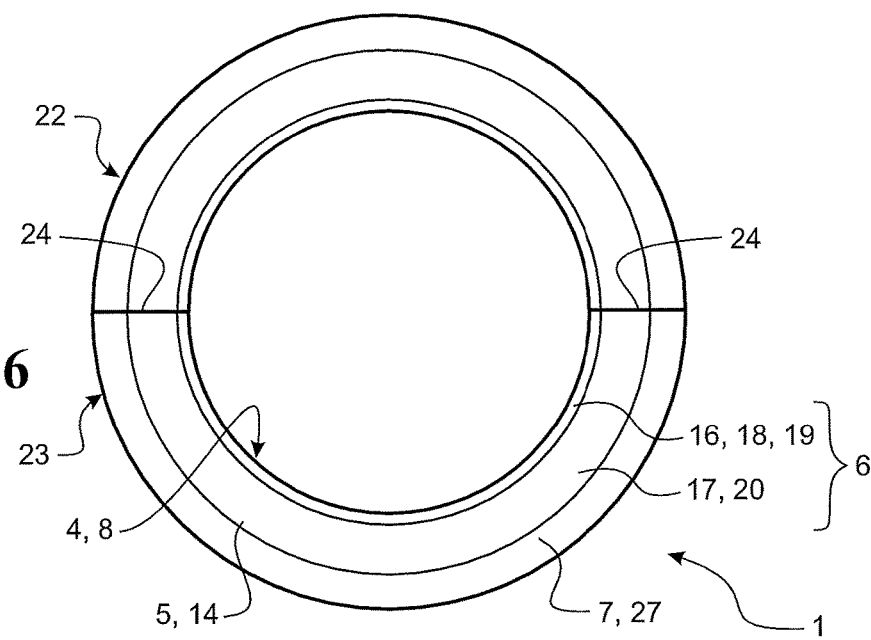
FIG. 6 is a view of a body looking down upon the front face according to the invention.
Figure 7A:
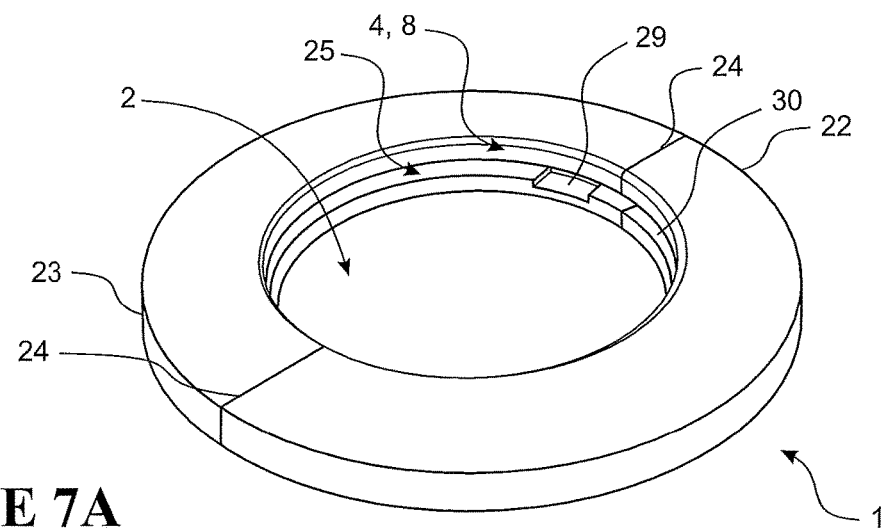
FIG. 7A shows a perspective view of the body of FIG. 6 looking downward upon the other side of the body, not being the front face.
Figure 7B:
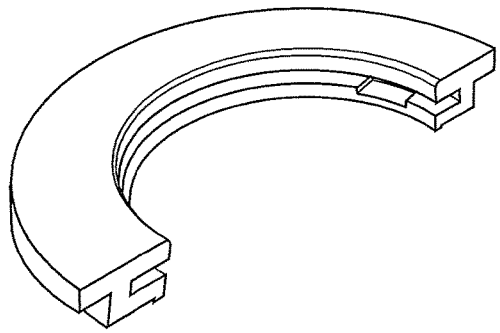
FIG. 7B is a half component which can make up the body more clearly showing a channel on the inner surface of the side wall.
Figure 8:
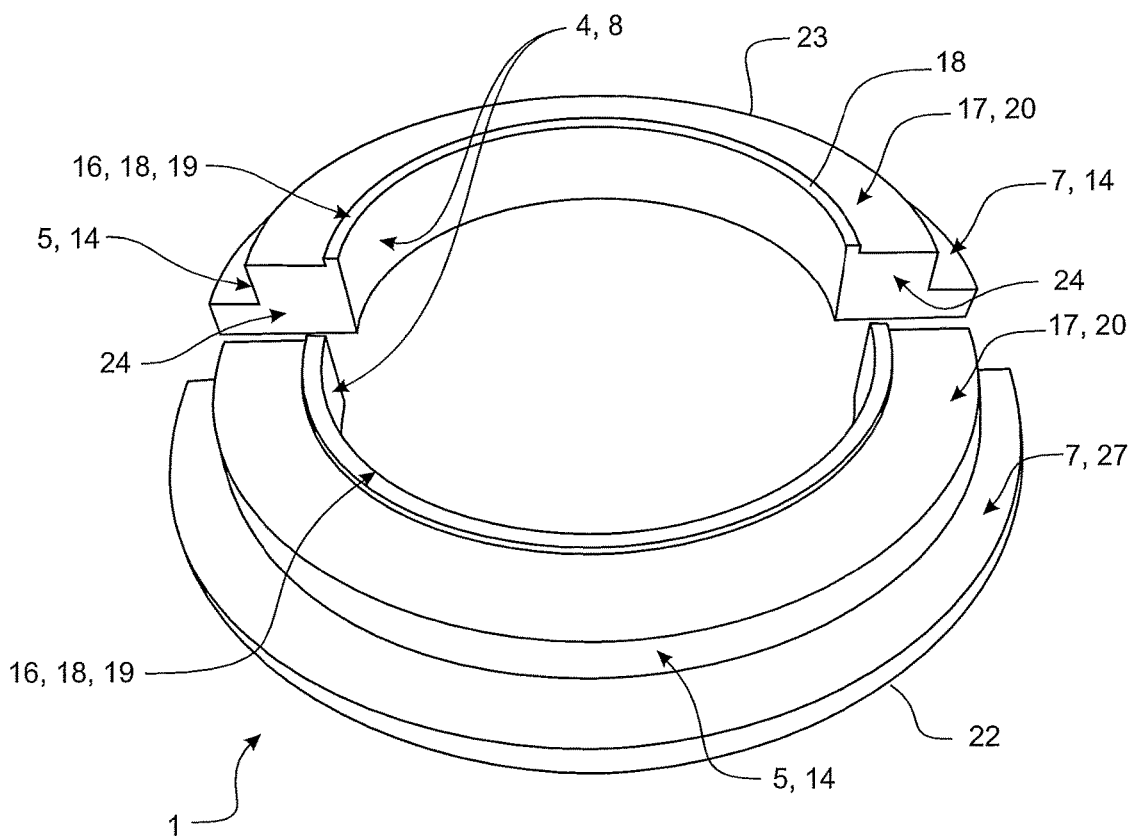
FIG. 8 is a side perspective view of a body in which the body is formed by bringing together two halves or half components.
Figure 9:
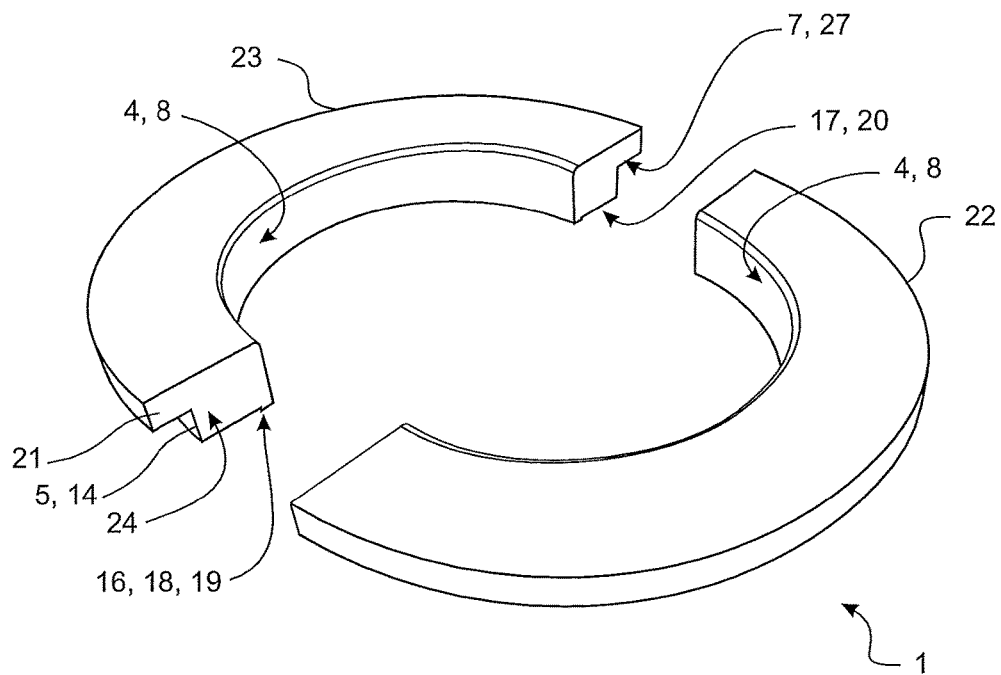
FIG. 9 is another perspective view of the body from FIG. 8.

In respect of existing solutions for reducing the size of an existing aperture 9 through a panel 3, FIGS. 2 and 3 illustrate one such method. In that solution, an annular ring 26 is separately cut or provided, typically cut from another sheet of the panel 3 so as to be inserted into the existing aperture 9. Such a ring 26 of the panel material is then jointed to the surrounding surfaces of the panel 3 by use of plaster joint tapes, then plaster or other concealing materials are applied over the tape, sanded or polish to provide a suitable finish which may then be painted or have other finishing surfaces or materials applied thereon. However, problems with this solution as previously set out.

Therefore, in one embodiment of his invention, there is provided a body 1 defining an aperture 2 to be formed in a panel 3. The body 1 comprises an inner surface 4, an outer surface 5, a front face 6 and a rear face 7. The inner surface 4 provides an inner side wall 8 of the aperture 2 to be formed, the aperture 2 to be formed being of a reduced size or altering the shape or geometry relative to an existing aperture 9 through a panel 3. The panel 3 has a thickness 10 defined between a first face 11 and a second face 12, and an existing aperture 9 side wall 13 as defined by the existing aperture 9 and which extends between the first and second faces 11, 12 of the panel. The outer surface 5 comprises an outer side wall 14 of the aperture 3 to be formed. The outer side wall 5 is to be located substantially adjacent to the existing aperture side wall 13. The rear face 7 provides for at least one support surface 27 to be located upon a region 15 of the second face 12 surrounding the existing aperture 9. The inner side wall 8 terminates as a rim 16 on the front face 6. The front face 6 comprises a recessed region 17 and the rim 16, where the rim has a rim surface 18. The rim surface 18 projects from the recessed region 17 so as to provide a reference surface 19, referenced relative to the first face 11 of the panel 3.

In another embodiment, there is provided a body 1 for defining an aperture to be formed in a panel. The body 1 comprises an inner surface 4, an outer surface 5, a front face 6 and a rear face 7. The aperture to be formed, which is to be varied in geometry (such as a reduced size or altered shape) relative to an existing aperture through a panel by the body. The inner surface provides for an inner side wall of the aperture to be formed. The panel having a thickness defined between a first face and a second face, and the panel having an existing aperture side wall as defined by the existing aperture and extending between the first and second faces of the pane. The outer surface comprises an outer side wall of the, or at least a part of the, aperture to be formed and/or of the existing aperture to be varied in geometry, with the outer side wall to be, at least in part, located substantially adjacent to the existing aperture side wall. The rear face provides for at least one support surface to be located upon a region of the second face of the panel surrounding the existing aperture. The inner side wall terminates with at least one rim on the front face, the front face comprising one or more recessed regions and each rim having a rim surface, the rim surface being a surface projected from at least one of the one or more recessed regions so as to provide a reference surface, referenced relative to the first face of the panel.

Figure 1:
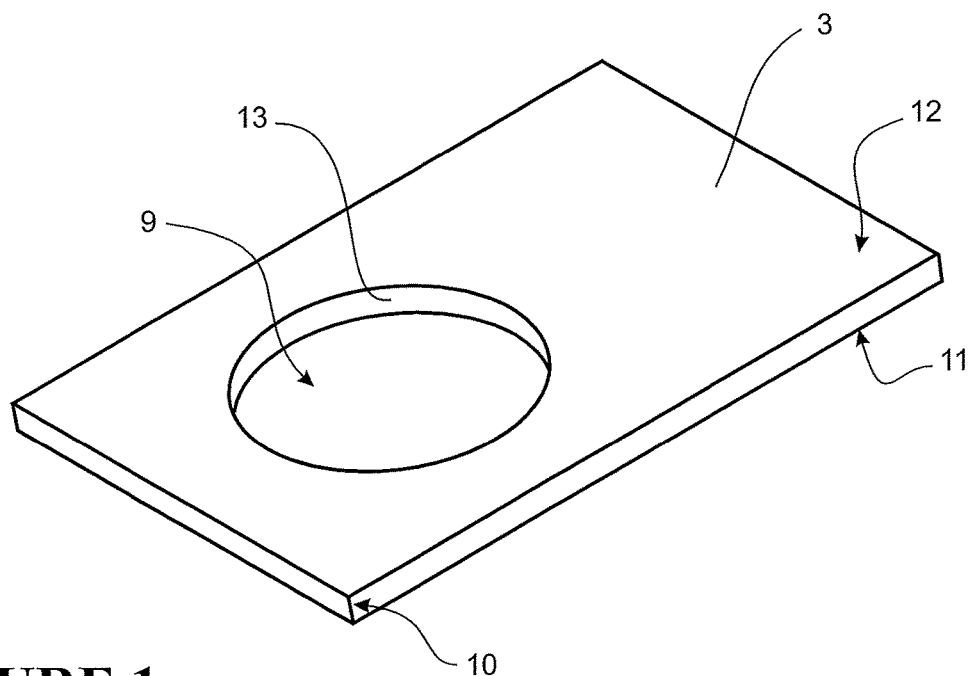
FIG. 1 illustrates a panel with an existing aperture into which the body of this invention may be inserted.

As shown by FIG. 1, a panel 3 may have an existing aperture 9 of a certain size. Where the geometry of that opening or aperture 9 is to be reduced or altered (for example in shape or size), then installation of the present invention can be used to achieve that means. It should be appreciated that whilst the figures show circular apertures, this invention can be applied to apertures which may be of rectilinear other shapes. In such situations, the body may be a whole or single piece configuration, or alternatively may comprise of multiple components (e.g. 22, 23) which can be brought together to form a whole body 1.

The body 1 is to be located within the existing aperture 9 of the panel 3 for altering geometry, such as the shape or reducing the size, such as the size of the opening, of that existing aperture 9.

In one preferred form, the rim surface 18 is substantially planar with the first face 11 of the panel 3 when the rear face 7 is located upon the second face 12 of the panel 3. More particularly, the rim surface 18 can be a substantially planar surface—for example, providing a planar and/or level surface upon which a material can be subsequently applied. The rim surface 18 is provided to receive a material.

The recessed region 17 is recessed relative to the rim surface 18. In this manner the recessed region 17 is a surface or surfaces 20 which is or are recessed from the first face 11 of the panel 3 when the rear face 7 is located upon the second face 12 of the panel 3. It will be appreciated location of the rear face 7 upon the second face of the panel facilitates location of the body with respect to the existing aperture and each of the first and second faces 11, 12 of the panel.

In various embodiments, such as those illustrated as FIGS. 14A-16B, the front face 6 can comprise of a plurality of associated recessed regions 17 (17A, 17B, 17C) each having an associated rim 16 (16A, 16B, 16C), each rim having an associated rim surface 18 (not labelled in the figures, but would be labelled as 18A, 18B, 18C), each of the associated rim surfaces 18 projecting from a respective associated recessed region 17.

Each rim surface 18 provides for a reference surface 19, which is to be referenced relative to the first face of the panel, or may be referenced to any another surface to which a desired finish material is wanted. In this way, the rim 16 can project to any desired gauge above the recessed region.

Each rim 16 is to be generally associated at least in part with an associated inner side wall 8 or a part of an inner side wall 8, for example the rim of 16A is associated with the inner side wall 8A, and the rim 16B is associated with the inner side wall 8B and so forth.

Advantageously, one or more of the plurality of associated recessed regions, e.g. 17B-17C and/or the associated rims, e.g. 16B-16C, or an associated recessed region and an associated rim (e.g. 17B and 16B; 17C and 16C), is/are separately connectable to, or disconnectable from, the body 1.

A connection system 32 can be is provided between a first of an associated recessed region an associated rim (e.g. 17A and 16A) and a second of an associated recessed region and an associated rim (e.g. 17B and 16B). The connection system 32 can allow for a connection or disconnection to or from the body 1 of one or more of the associated recessed regions with an associated rim or one or more associated recessed regions. In this way, the body 1 can facilitate a variety of different aperture geometries to be achieved through use of a single body 1.

The connection system 32 may be of any suitable form, but for example may be a snap-in or snap-out fit type arrangement.

In another embodiment, the connection system 32 may be a frangible connection or a series of frangible connection points (such as small teeth which may be broken on application of a force) provided, for example between a first of an associated recessed region and an associated rim (e.g. 17A and 16A) and a second of an associated recessed region and an associated rim (e.g. 17B and 16B). The frangible connection can allow for disconnection or removal of one or more recessed region(s) and rim(s) from the body 1, Frangible connection points may be a series of teeth, for example those shown in FIGS. 15A-B, 16A-16B In a preferred arrangement, the frangible connection 32 can be located between an inner side wall of the first associated recessed region with the first associated rim and the second recessed region with the second associated rim. The at least one frangible connection allows for a disconnection or removal of at least one associated region and associated rim from another associated region and associated rim, thereby providing an end user of the body to customise the inner aperture geometry according to a desired sizing need.

Any sequence of sizings may be provided for the aperture to be formed by the inner side wall of the body, however some preferred circular sizings are: a large diameter of about 103 mm and then a series of reduced diameters, such as for example, but not limited to those having an inner side wall diameter of about 93 mm, or about 80 mm.

As seen from the figures, where there is a plurality of associated recessed regions and/or associated rim, these together form the front face 6 (16-20) of the body 1.

As mentioned, the connection system 32 can allow for a snap-in or snap-fit connection for connecting one or more associated recessed regions with an associated rim and an inner side wall to the body or to one or more associated recessed regions with an associated rim and an inner side wall. In this way, the front face may be constructed or deconstructed to have additional (or less) sets of recessed regions and rims, depending on the desired inner diameter of the aperture to be formed. The front face 6 can comprise of a series or sequence of sets of associated recessed regions and associated rims each with an associated inner side wall, whether removable from or connectable to the body, each set providing geometry (such as size or shape).

It will be appreciated various geometric forms can be taken, but in one example, the plurality of associated recessed regions and associated rims with associated inner side walls are concentric with each other. For example, there may be a concentric series of sets of associated recessed regions and associated rims with associated inner side walls.

Figure 16A:
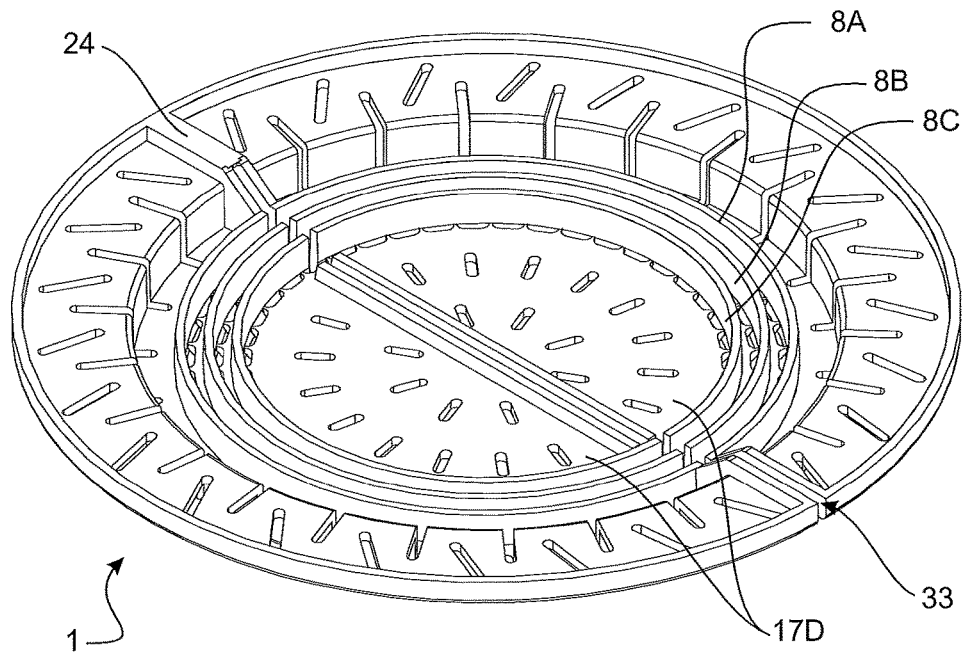
FIG. 16A is a rear perspective view and FIG. 16B is a front perspective view of another embodiment of this invention in which three sets of recessed regions each with an associated rim and inner side wall are provided, together with a central recessed region.
Figure 16B:
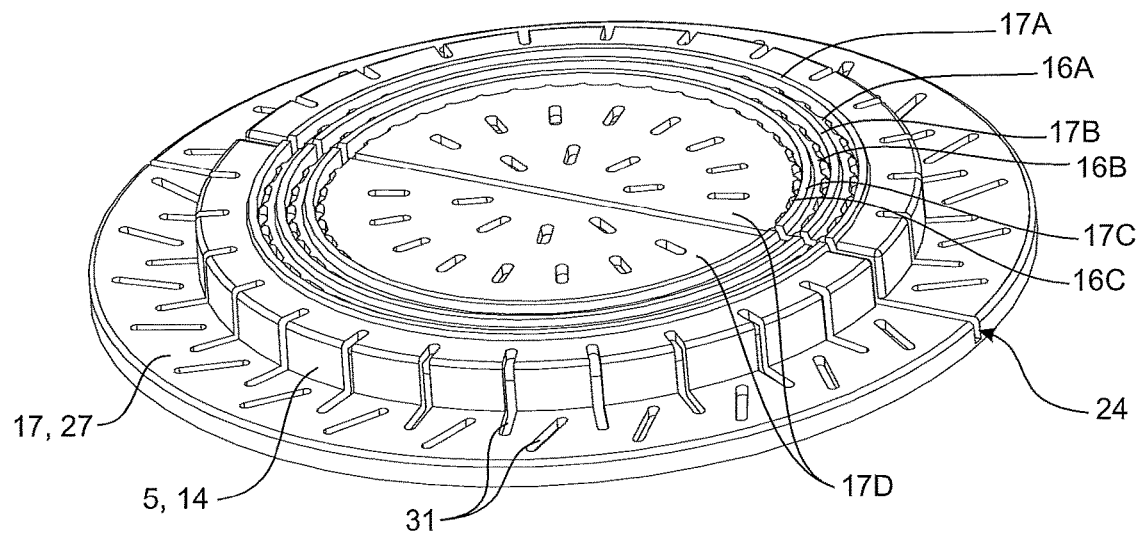
Figure 17A:
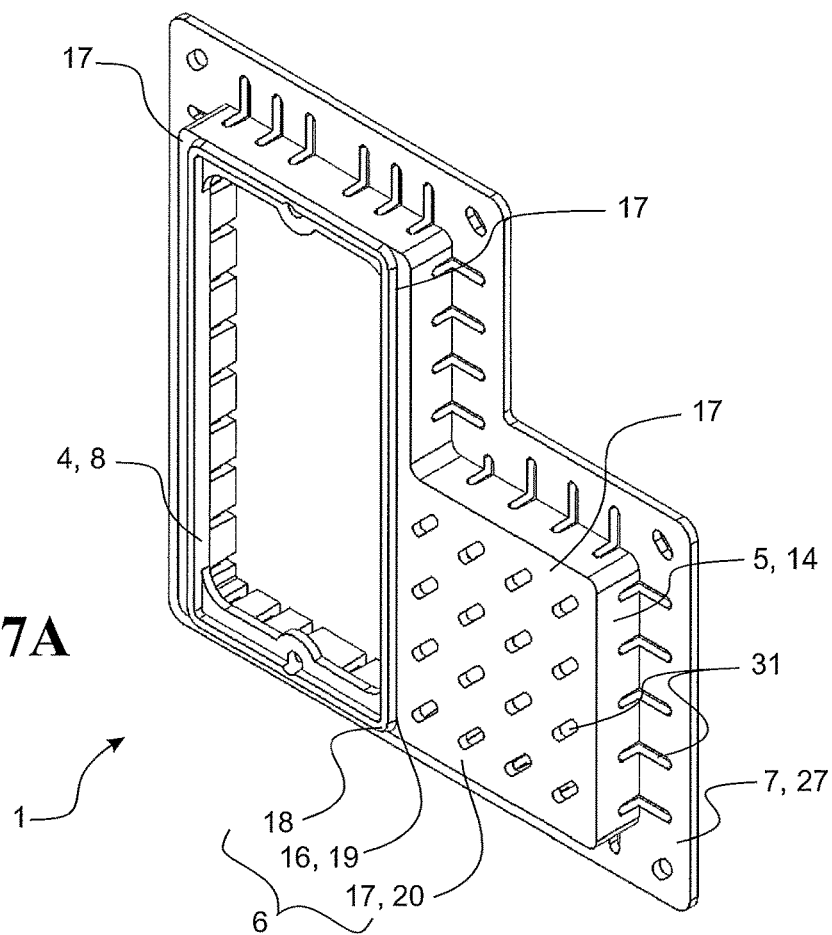
FIG. 17A is a rear perspective view and FIG. 17B is a front perspective view of another embodiment of this invention in a body is configured to include a recessed region and a rim in a different overall geometry to that of the earlier figures.
Figure 17B:
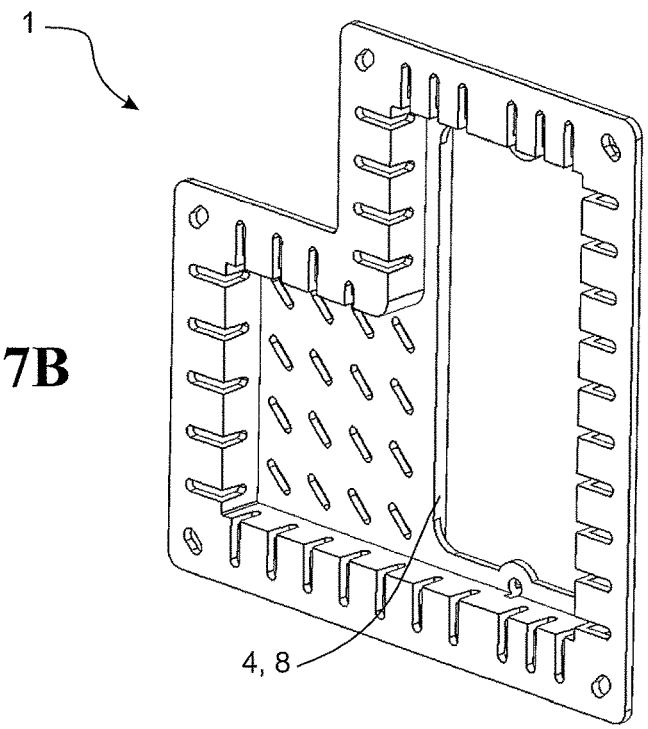
Figure 18A:
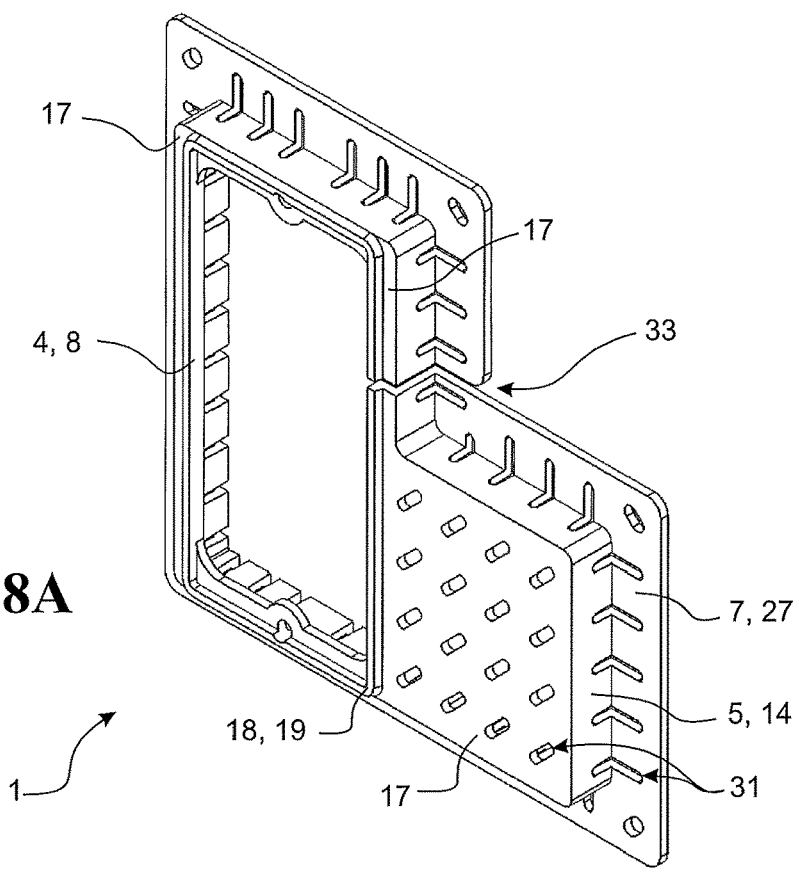
FIG. 18A is a rear perspective view and FIG. 18B is a front perspective view of another embodiment of FIGS. 17A and 17B in which a cut-out is provided to more easily facilitate a bending of the body.
Figure 18B:
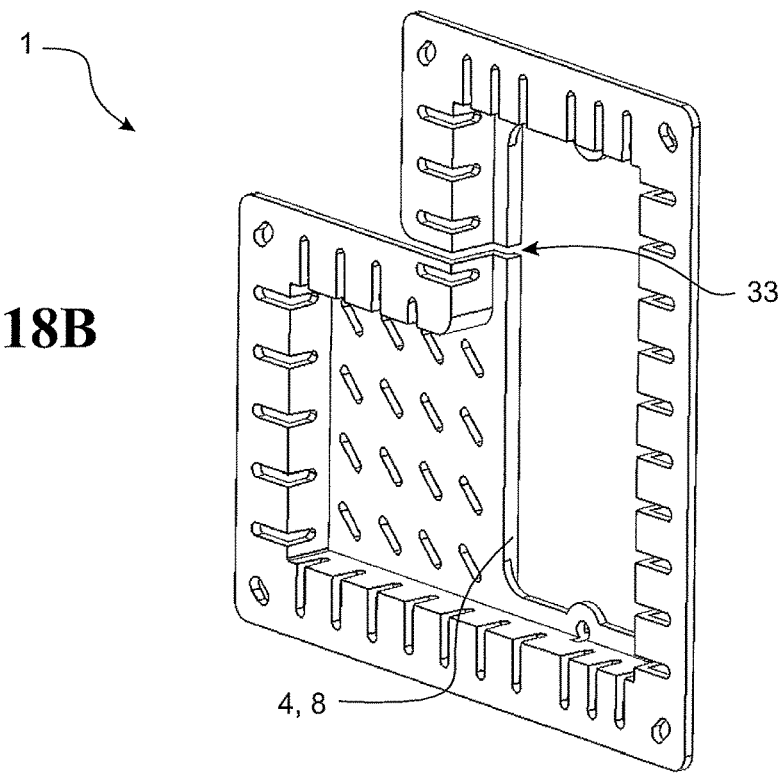

In yet another embodiment, the front face 6 of the body may comprise of an additional recessed region, such as that itemised as a central recessed region 17D in FIGS. 16A, 16B. Such a central recessed region may be optionally surrounded by a rim, such as 16C that is associated with a different recessed region, such as that of 17C and a different side wall, such as that of 8C.

In various embodiments, the centralised recessed region 17D allows the body 1 to be used as a plug for completely enclosing an existing aperture. The centralised recessed region 17D may be removed so as to provide for a body 1 which then defines an inner aperture. The recessed region 17D may be removed via use of frangible connection points surrounding an outer perimeter of the region 17D, or each part of region 17D. In an alternative, it will be appreciated that the region 17D may be inserted or fitted into place with respect to the body 1 (e.g. a body 1 with one or a plurality of recessed regions and rims and inner side walls, can be configured to receive a further recessed region. In this manner, the further recessed region can provide for a plug of the inner aperture so formed and the body 1 can then be used to completely close or enclose an existing aperture through a building panel.

Where the recessed region 17D is to be removed via use of frangible connections, such frangible connections may be those as utilised between one or more of a plurality of associated recessed regions and associated rims and their respective inner side walls. For example, a series of teeth may be provided (for example as shown in FIGS. 16A, 16B) which can allow for the recessed region 17D to be pushed out from an in-situ connection.

It will be appreciated the rim 16 with a rim surface 18 can be gauged so as to project relative to the first face of a panel a pre-determined distance.

In certain forms, the recessed region 17 may be additionally provided with one or more surface reliefs or perforations or undulations or an undulating surface (not shown in any of FIGS. 4-12, but is illustrated in FIGS. 13A-18B, and may be optionally included any part of the recessed region or other surfaces of the body 1). Such surface relief or perforations or undulations or an undulating surface may provide for additional surface area upon which a material can be applied upon. In some examples, the recessed surface 20 is textured so as to provide for a surface more capable of being engaged by a material applied upon it, such texturing may contribute to the undulations, or may itself be the undulations. Generally however, the surface 20 of the recessed region 17 is a material engaging surface, or a surface upon which material is to be applied.

The surface relief may comprises of perforations, such as those indicated as item 31, and may comprises slits or slots through the front face or other surfaces, such as the outer surface or inner surface (or combinations of one or more of these), either partially formed (for example, more an as an indentation) into the material of the body, or as a complete cut-out or portion of the body which is devoid of material forming the body (for example, more as a perforation). In this manner, surfaces can be provided with various surface relief patterns or indentations or perforations for improving or providing additional surface area for a mechanical connection of any material such as plaster or adhesives or other finishing or intermediate materials to be engaged or become connected with the body.

Each of FIGS. 13-19 show various embodiments of a body 1 according to this invention in which a surface relief is provided on at least one surface of the body, for example whether as part of the recessed region or another surface.

Application of material to the recessed region 17 allows for the surface 20 to be built up so as to be level with the rim surface 18. In this manner, the rim surface 18 provides a reference surface or level to which the recessed region 17 is to be levelled up to by material in-filling the recess. See for example FIG. 12, as well as the enlarged portion view of FIG. 12, in which a material 28 has been applied in sufficient amount so as to in-fill or build up the level of the recessed region 17 to be substantially level or planar with the rim surface 18. It will be seen that the rim surface 18 provides a reference 19 upon which an user or installer of the body, or another user may apply material 28 to the body so as to reach a pre-determined reference height of material build up. The reference level 19 may advantageously be provided so as to be at the same or a similar level to either the surface of the front face 11 of the panel 3, or may be to the same or a similar level to a finished level of the front face 11, for example a finished level may be one which has had plaster or paints applied thereto.

Figure 12:
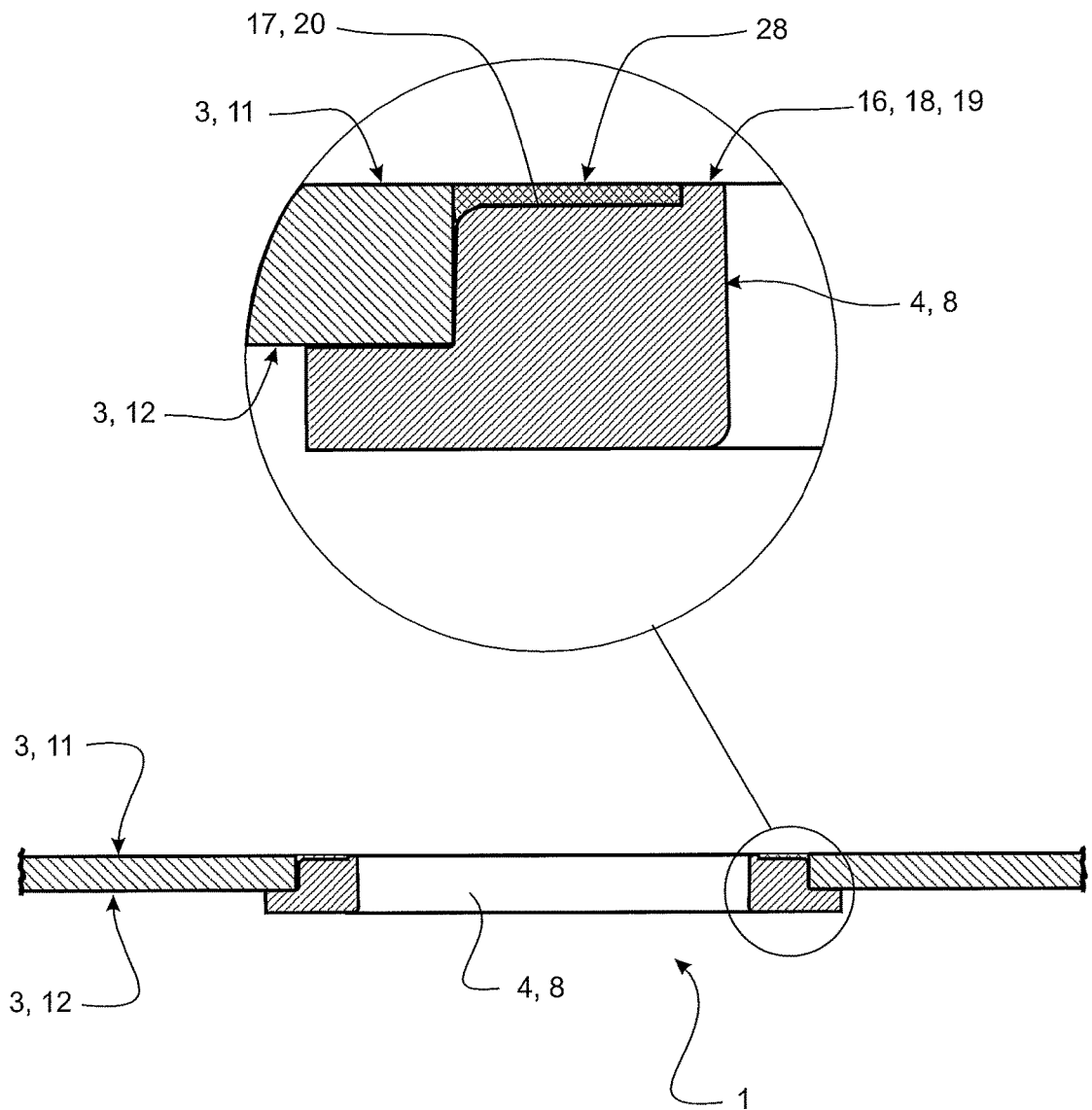
FIG. 12 is a cross-section through an installed body in an existing aperture, and in which a material has been applied to the recessed region to bring at least that region up to a level in-line with the rim surface, together with an enlarged view of a section where the body engages or becomes jointed with a surrounding panel.
Figure 13A:
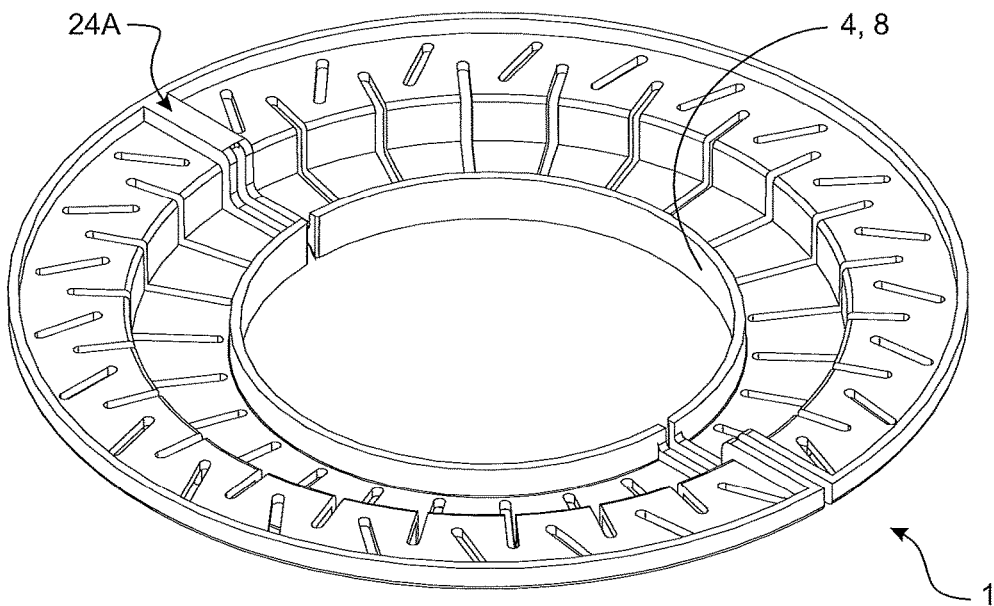
FIG. 13A is a rear perspective view and FIG. 13B is a front perspective view of another embodiment according to the invention.
Figure 13B:
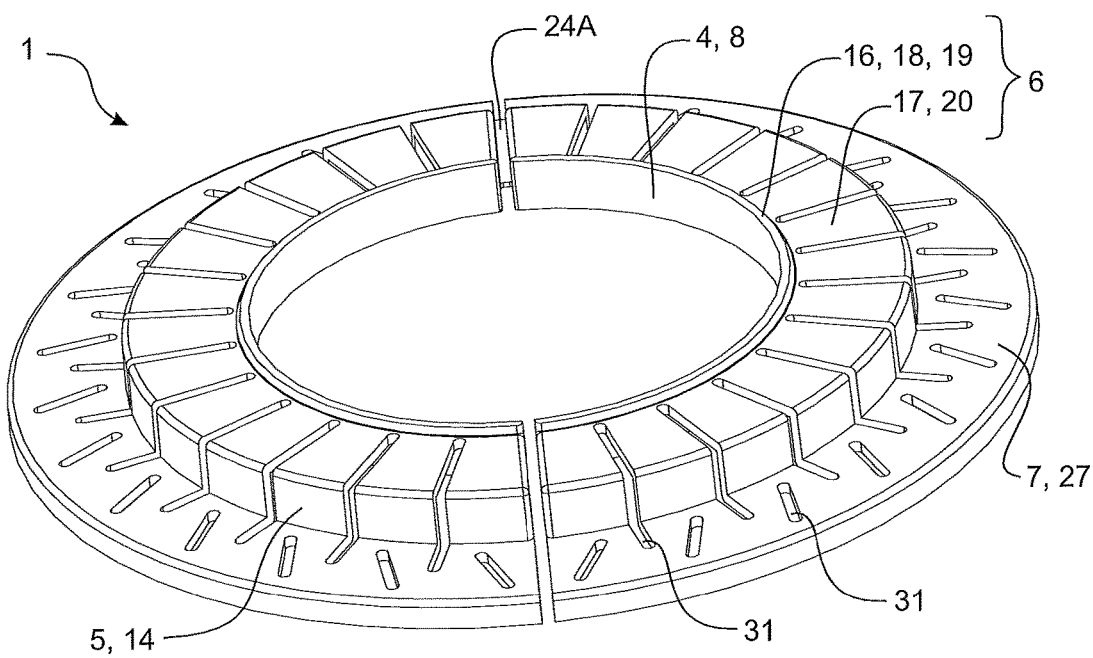
Figure 14A:
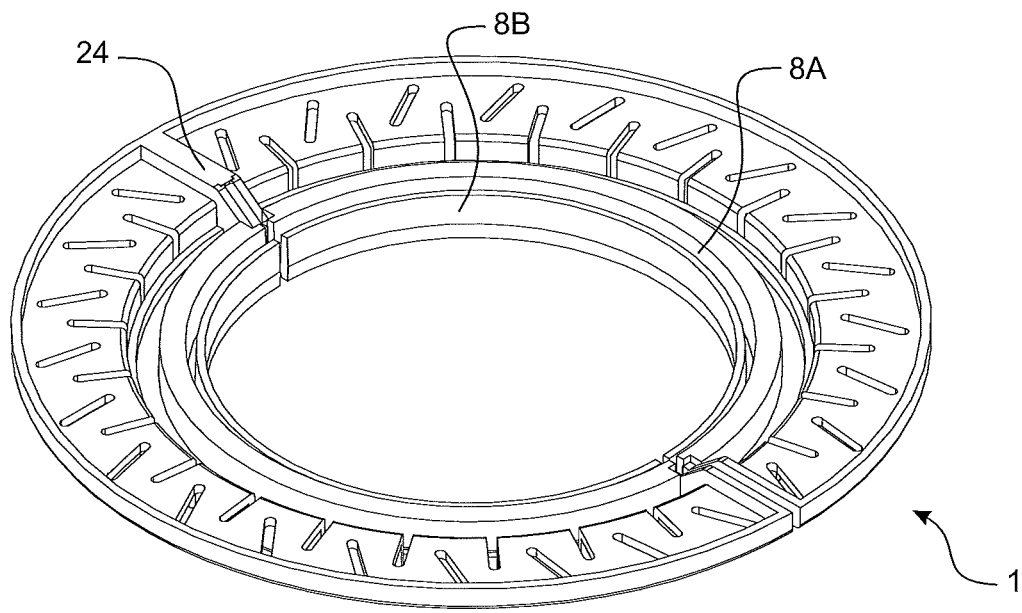
FIG. 14A is a rear perspective view and FIG. 14B is a front perspective view of another embodiment of this invention in which a pair of recessed regions each with an associated rim and inner side wall are provided.
Figure 14B:
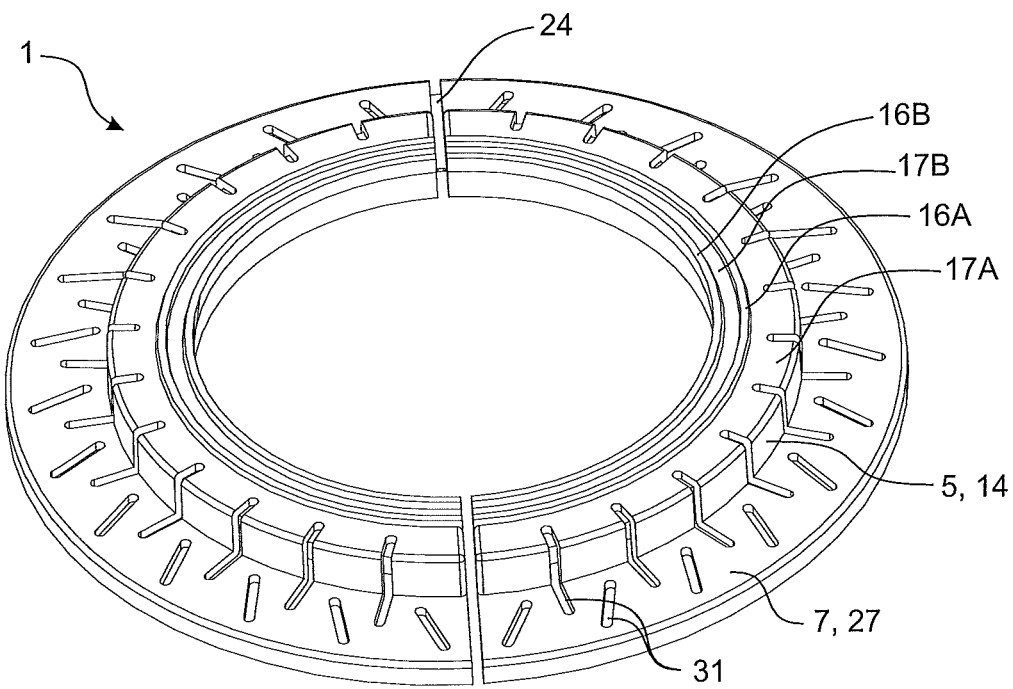
Figure 15A:
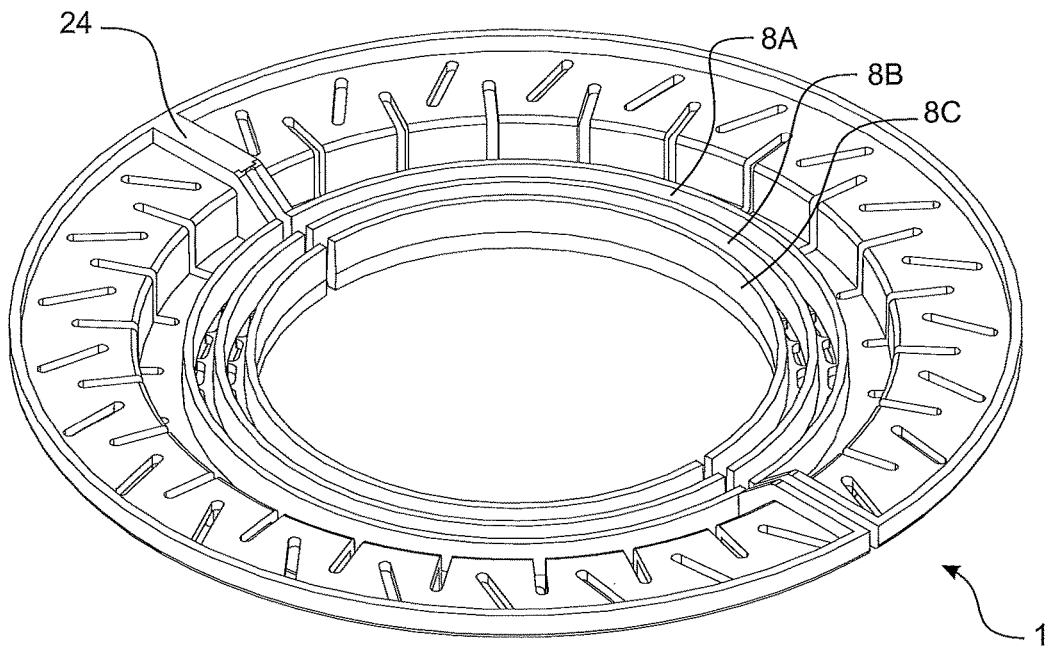
FIG. 15A is a rear perspective view and FIG. 15B is a front perspective view of another embodiment of this invention in which three sets of recessed regions each with an associated rim and inner side wall are provided.
Figure 15B:
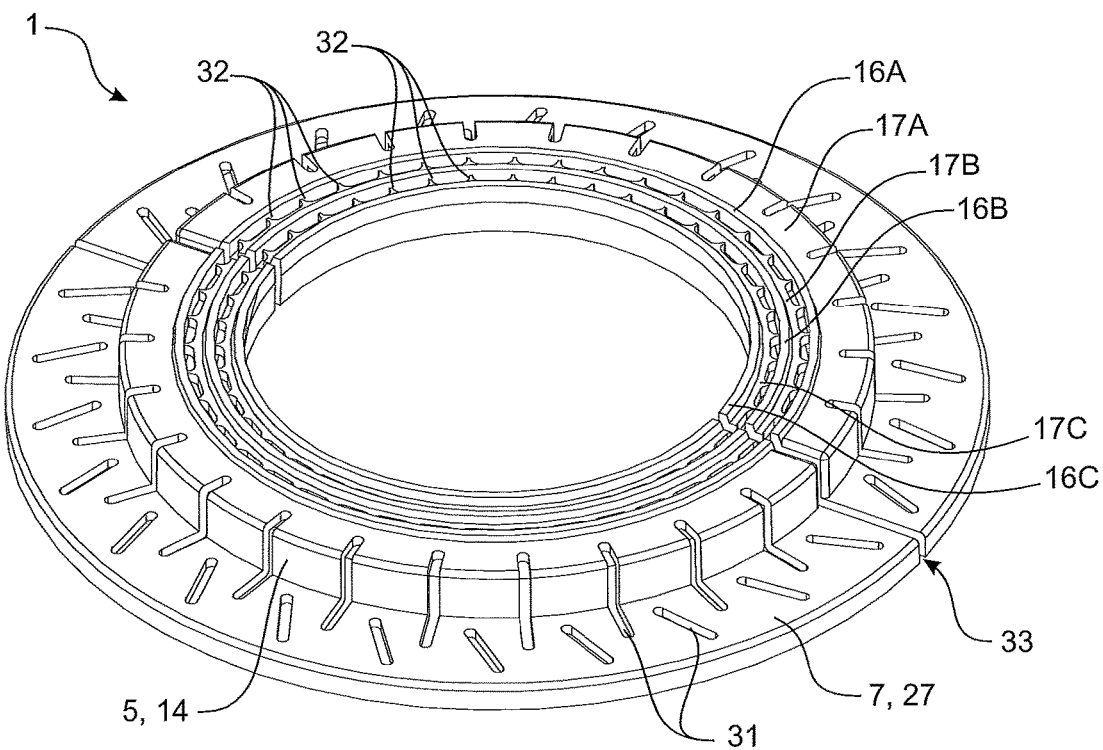

Further, FIG. 12 will assist with an understanding that the rear surface 7 with the support surface 27 may rest or be placed or located upon the second face 12 of the panel 3. In this manner, an adhesive or bonding agent may have been applied to the rear surface 7, or perhaps upon the second face 12 itself in preparation of receiving the rear face. Once located, the rear face can support or assist to locate the remainder of the body 1 into a suitable position with respect to the front face and the existing aperture.

Figure 10:
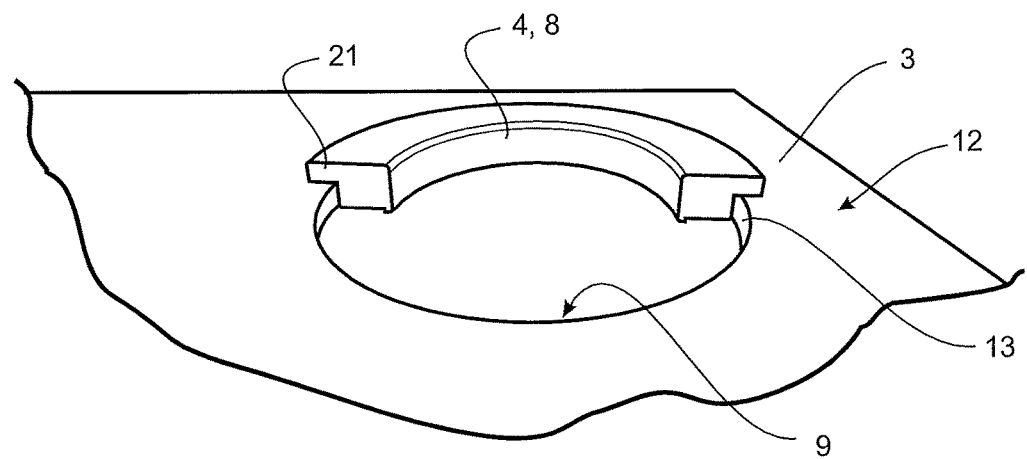
FIG. 10 illustrates a part sectional view of component to be used in forming the body of this invention when located in-situ in an existing aperture through a panel when looking down upon the second face of the panel.
Figure 11:
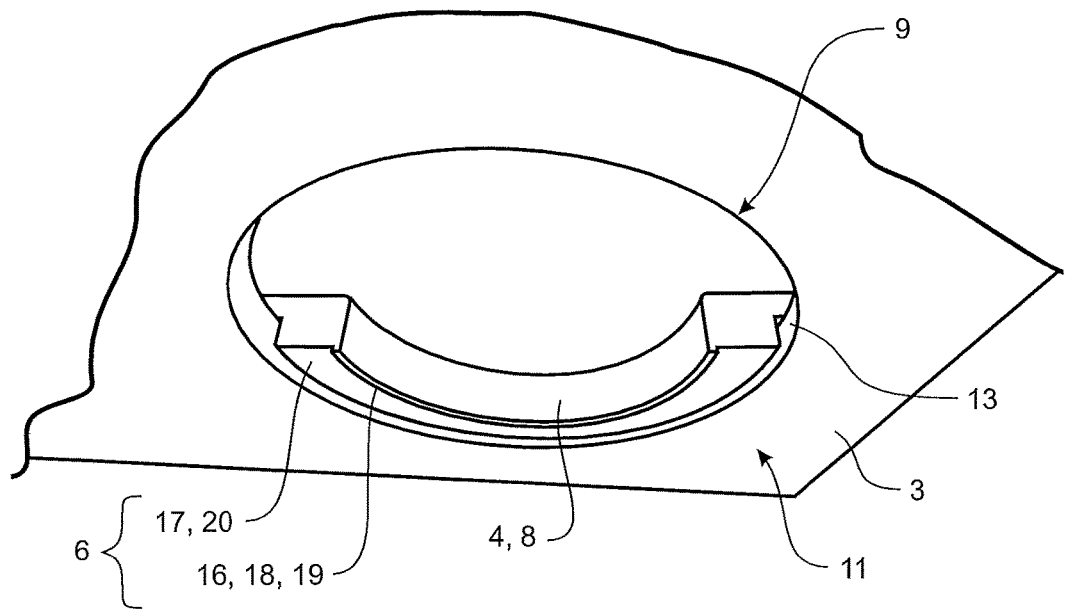
FIG. 11 illustrates a part sectional view of component to be used in forming the body of this invention when located in-situ in an existing aperture through a panel when looking upwardly upon the first face of the panel.

As shown by FIGS. 10 and 11, the body 1 is to be located within an existing aperture 9. The side wall 14 of the outer surface 5 can come into engagement or be located upon or adjacent to the side wall 13 of the existing aperture. The new aperture 2 can then be formed by the inner surface 4 and its side wall 8.

FIGS. 5-9 illustrate further details of the invention which are describe in more detail below.

It will be appreciated the front face 6 includes the surface 20 of the recessed region 17, as well as the rim surface 18. Each of these surfaces 18, 20 can have applied a material thereupon.

In respect of the rim surface 18, a material 28 can be applied thereupon. Where a material is applied to the rim surface, the recessed region 17 can be built up further. In this way, the recessed region 17 has material applied in a sufficient quantity so as to be level or planar with the material applied upon the rim surface.

The material(s) which can be applied to the front face can be applied as a singular or compound composition(s), in a single or multiple layers. Such materials may be one or a combination of any one of the following materials; although it will be appreciated any such applicable building material may be applied: a levelling material(s), a filling material(s), a jointing compound, a concealing material(s), a finishing material(s). Examples of such materials include, plaster or fibrous plaster compounds, such as those which are gypsum containing, silicon sealing compound, paints, other filler materials or finishing products.

The front face 6 should receive sufficient material so as to be substantially levelled with the first face 11 of the panel 3 according to the needs of the user, or to match the level or finish of the first face of the panel. For example, if a first face of the panel 3 is finished in paint, then suitable concealing or filling materials should be applied to the front face in order to achieve a front face that is substantially level or planar with the surrounding panel front face, the front face with material applied thereto can then be finished appropriately, for example with a paint.

The rear face 7 can be at least one flanged portion 21. Such a flanged portion 21 extends generally outwardly from the outer surface 5.

The flanged portion(s) 21 extend(s) outwardly so as to be supported upon the region 15 of the second face 12 surrounding the existing aperture 9. For the rear face 7 to be supported upon region 15, the rear face should be able to rest or be located upon or engage with an area of the second face 12 which is overlapped by the at least one flanged portion 21.

It will be appreciated the region 15 upon which the flange portion 21 can extend and be supported upon can be the whole or at least a section of a perimeter of the second face about the existing aperture. The flanged portion 21 may be a continuous flange, contiguous with the outer surface 5.

In one example, the body 1 may be of a castellated form. The body 1 may be formed by a series of castellated surfaces which are each provided as contiguous surfaces of the body, each of the castellations providing for surfaces of the respective inner surface, outer surface, front face and the rear face, each of these surfaces performing their functions as described above.

When the body 1 is provided in-situ in an existing aperture 9 of the panel 3, the rear face 7 is positioned to be located upon the second face 12 of the panel in a manner to support the body 1. In this way, a user may extend the body 1 or sections of the body through the existing aperture in the panel 3, and position the body 1 so that the rear 7 is located upon the second face 12. Accordingly, the body 1 or at least the section of the body which has just been located is self-supported or positioned within the existing aperture and by the second face 12.

In particular, the body 1 can be self-supporting when the rear face 7 is located upon the second face in the situation where the existing aperture is a through-hole of a ceiling panel, the first face of the ceiling panel being the painted or finished surface within a room or building, and the second face of the ceiling panel being the side of the panel which is in the ceiling space. In this embodiment, the front face of the body 1 is therefore a surface of the body which is exposed for viewing by inhabitants of a building, and therefore is typically finished with paints or other surface finishing materials.

In an alternative embodiment, the existing aperture may be a through-hole of a wall panel. In this form, the rear face 7 provides for a support which is to engage with the second face of the wall panel so as to locate the body 1 or at least sections of the body in position.

According to this invention, the front face 6 can be dimensioned so as to provide a width as necessary to achieve a pre-determined alteration of the size of the existing aperture. By varying the width of the front face 6, a body 1 can be used to have the same external shape or dimension or size as necessary to engage with the existing aperture through a panel, yet the inner surface can provide for an aperture size according to a user's needs.

For example, the size of an aperture through a ceiling panel for traditional incandescent lighting fixtures typically requires an aperture size to be larger than that say for a halogen lighting fixture, or for a light emitting diode (LED) lighting fixture, or as may be contemplated by this invention, any other device or fixture or fitting which requires a reduced aperture size through a panel compared to the existing aperture already so formed.

In another example, the size of an aperture through a wall panel may need to be reduced, such as where a conduit of a certain size extending through the wall is to be replaced by a reduced diameter conduit. In this way, the size of the aperture in the wall panel needs to be reduced so that a close fitting of the wall about the new (replacement) conduit is to be achieved and a finished surface of the wall panel is to be provided.

It will also be appreciated this invention may have particular application to yet other panels, such as building panels, where an aperture so formed needs to be reduced in size, yet a suitable finishing is to be provided about the newly reduced aperture and to the surrounding surface of the panel having the reduced aperture. Concealing, filling, finishing or other materials can be applied to the front face of the body 1 so that the joint between the body 1 and the surrounding surface of the front face of the panel is formed and finished, or made commensurate with the finish or a desired finish of the front face of the panel.

Yet further, in preferred embodiments, body 1 can be formed by bring together one or more components, such as the pair of halves 22, 23. Each of the components may be inter-connectable with each other so as to form the body 1.

Each of the components, such as 22, 23, can individually define at least a partial section of the body 1.

The components, such as 22, 23, may include at least one inter-connect region 24 for connection or co-location with an adjacent component.

The inter-connect region 24 or inter-connection is a hinged joint. Although a single hinged joint is shown in FIGS. 13A-16B, the body 1 may comprises of additional inter-connection regions as necessary, and depending on the number of components to which the body 1 is to be formed.

Where a hinged joint or other bendable joint is provided, this may facilitate the body 1 to be collapsed in on itself so as to allow a use to then insert the body 1 into an existing aperture, and the joint may have a degree of elasticity to help the body 1 then re-form itself and assume the shape for being an insert into the exiting aperture.

As shown in the figures, a cut-out section 33 may be provided without any inter-connection region 24. In this way, the body 1 may also be subject to a user applying torsional twist to help bend the body, in addition to bending at the hinge point, so enable to body 1 to assume a shape which allows insertion into an existing aperture. See for example FIGS. 13A-B, 14A-B, 15A-B, 16A-B, 18A-B; all of which utilise a cut-out section 33. In one form, inter-connection of components may be via a male part of one component to be received by a female part of another component. Alternatively, inter-connection may be by use of an adhesive or a bonding agent applied to an inter-connection region.

The inter-connection can be, or provide for, co-location of a part of one component with a part of another component. In use, the one or more components can be co-locatable with each other when positioned within the existing aperture, thereby together forming the body 1.

In other embodiments, the inner side wall surface may additional include a channel 25. Such a channel or channels can be shaped or located about the inner surface or side wall so as to be capable of receiving a fitting of a component to be inserted or located within the aperture defined by the body 1. For example, the channel 25 may be suited for receiving a lug or other such projection or another or other locating mechanism(s) from one of: a lighting fixture, a through pipe or conduit. In one embodiment, the channel may for example be such as that shown by FIG. 7A, both the whole view of an assembled body 1 comprising of two half components, 22, 23, as well as a further view of single half component as FIG. 7B. The channel 25 is located on the inner surface and side wall 4, 8 or the body 1. However, it may be appreciated that the channel 25 could be provided at other locations or positions, or other channels may be located at other positions in addition to channel(s) on the inner surface side wall 4, 8.

In certain embodiments, the channel 25 may include an entry region 29 for receiving of a fitting, and a securement region 30 for securing or retaining of a fitting. As noted above, a fitting may be a projection, such as a lug, which may extending from an item to be located or housed within the aperture 2 defined by the body 1.

The aperture 2 defined by the body 1 can be of any shape. Various examples include circular, oval or elongated shapes, rectilinear, square, and rectangular or other geometric shapes. It will be appreciated the outer surface may be of any necessary shape so as to substantially align with the side walls 13 of the existing aperture 9, whist the inner surface and its side wall 4, 8 are used to define aperture 2 which is a desired aperture size and shape of a user or installer or for a particular application, installation or use.

The body 1 or components, such as 22, 23, of the body is/are a pre-form. In this manner, the front face of the body can be build up upon by application of materials in order to provide for a concealed joint between the body 1 and surrounding first face of the panel 3 when in-situ.

The rim surface 18 provides for a reference surface upon which a user may base levelling or application of material. Additionally, as the body 1 can be a pre-form, the body provides a platform upon which a user may apply material to achieve a final desired surface or finish.

The body 1 or components, such as 22, 23, can be formed in any manner. However preferred may be casting or moulding, such as injection moulding or extrusion moulding, depending on the shape of the body 1 or components, such as 22, 23 to be achieved.

Various individual or combinations or compound materials may be used to form the body 1, or components to form the body, such as 22, 23. The material to use will depend on the specific application or use. However, some particularly preferred materials comprise one or more of: fibrous plasters such as compositions comprising gypsum, polymers, metals, compositions comprising fibrous reinforcement, including cementitious fibre reinforced materials, fibre-glass materials.

Particularly preferred is a body 1 formed of a material comprising fibrous plaster compound, such as those including gypsum.

It will also be appreciated sections or parts or portions of the body 1 may be formed of a combination or materials, for example where a channel is provided on the inner surface, such a channel may need to provide particular structural characteristics suitable for repeated wear and tear, for example where a unit being inserted or removed from the aperture formed by the body, such as a light fitting of fixture, is to be engaged. In one example, the channel may be a metal or suitable strength polymer provided as a component of the pre-form.

Materials such as steels, stainless steels, aluminium, PE, PP, PET or other polymers may all have application or use. It will be appreciated these are but a small selection of materials for forming or which may be combined as a part of the body 1, other body materials may be utilised according to the specific situation or characteristics or material properties desired or needed by the body 1 in certain installations or applications.

Yet further, it may be desirable for the body 1 to achieve certain desired characteristics in terms of structural strength, fire or chemical resistance or ability to retard fire. For example, components or compounds may be included in the body or the body so formed to achieve: electrical conductivity, anti-static properties, electrically insulation, fire resistance or fire retarding capabilities, or even fire self-extinguishing properties.

Where reference in this specification is made to a "panel", such a panel may include building panels, such as ceiling panels or wall panels. In certain typical applications, panel may be a building panel of fibrous plaster comprising gypsum.

As described above, adhesive or other bonding agents may be utilised to assist or prove for engagement or interconnection the body 1 and surfaces of the panel 3, or between components, such as 22, 23 which form the body 1. In these situations, an adhesive may be pre-applied or provided upon surface of the body 1 which is to become engaged or inter-connected. The adhesive or bonding agent may have a removal backing, such as a paper or sheet, which once removed exposes the adhesive or bonding agent for use.

In various embodiments, the adhesive or bonding agent may be curable by exposure to the surface which it is desired to come into contact with. Alternatively, another means may be used to facilitate curing—such as heat source, for example infra-red, or another energy source, for example ultra-sound, to excite the adhesive and set-off the curing process.

Bearing in mind the above, the body 1 may be installed in an existing aperture to reduce the size of that aperture. The body 1 itself defining an aperture about its inner surface. Typically, the body 1 of this invention may be installed according to the steps of:
  positioning the body within the existing aperture,
  securing the body into position by locating the outer side wall into an engaging position with the existing aperture side wall and the rear face into an engaging position with the panel by locating the rear face upon a region of the second face of the panel surrounding the existing aperture,
  concealing the joint between the body and the first face of the panel.

As mentioned above, an adhesive can be applied to the outer side wall of the body or the rear face, or both, such that upon installation the applied adhesive comes into contact with and becomes engaged or bonded with surfaces of the panel. The adhesive is either passively or actively activated to cure and adhere to the panel so as to secure the body 1 in position.

The concealing step allows for application of a sufficient amount of the one or more materials as discussed above. Application of the material is performed by a user until the front face is made level with the first face of the panel.

Sufficient amounts of material, such as plaster or similar materials, can be applied at joint regions of the body 1 and the building panel 3, then allowing the material, such as plaster to settle, and then polishing the material, such as sanding of plaster or similar material, to achieve a finished surface, optionally with a further final finishing material, such as a paint, applied.

Various tapes, such as a jointing tape, may be optionally applied about joint regions between the front face and the first face of the panel, although the present invention may allow a user to wholly negate the use of such an additional joint concealing material.

In yet further embodiments, reference is made to FIGS. 17A-19 in which a further exemplification of the invention is provided. Such an exemplification may take particular application for use in re-sizing or arranging the geometry of an existing aperture, such as for a wall socket of an electrical connection.

With reference to FIGS. 17A-18B, there is provided a body 1 in accordance with the present invention, for which the various features have been labelled. A cut-out portion 33 can be provided to allow a user to bend or apply a torsional force to the body 1 to re-shape or configure the body 1 so as to be inserted into an existing aperture cut or made.

Figure 19:
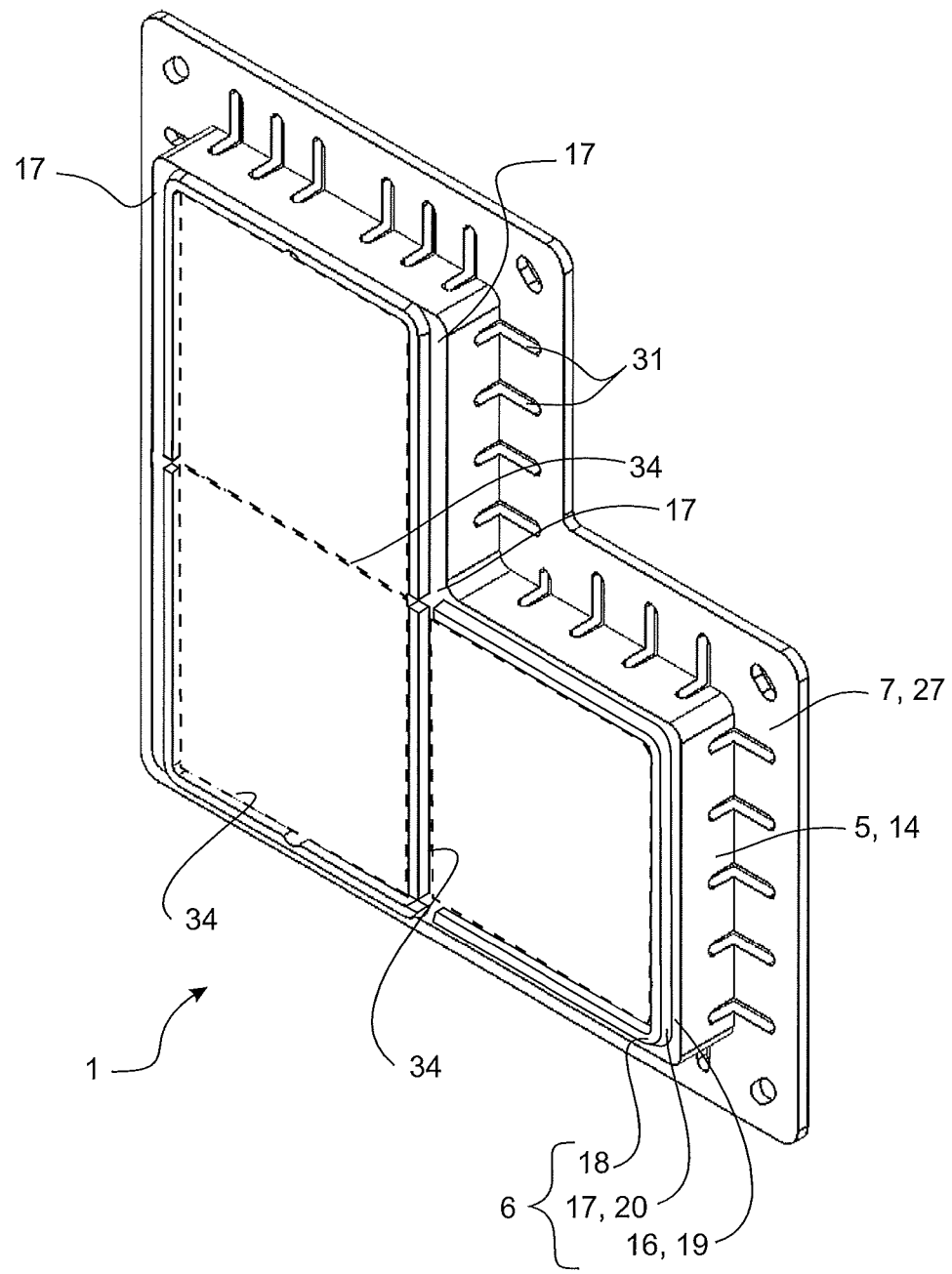
FIG. 19 is yet a further embodiment of this invention in which a series out snap-out or frangible recessed regions (some may be left in-situ) may be removed to reveal a body with a rim and an inner side wall defining an aperture to be formed.

With reference to FIG. 19, a series of discrete portions may be removed from the body 1, for example using perforated or frangible connection sections to allow for the removal of those portions along the frangible connection sections indicated by item 34, to reveal an inner aperture geometry desired by user, yet which leaves a rim and a recessed region for a user to then utilise in accordance with the benefits and methods described above. It will be further appreciated, that the recessed region 17, as well as other surfaces of any of the embodiment described here, can include surface relief or surface texturing or other forms of perforations or undulations. In this manner, a surface is provided upon which a material can be applied, with the surface relief allowing for an improved mechanical connector between the material and the various surfaces of the body.

Figure 20:
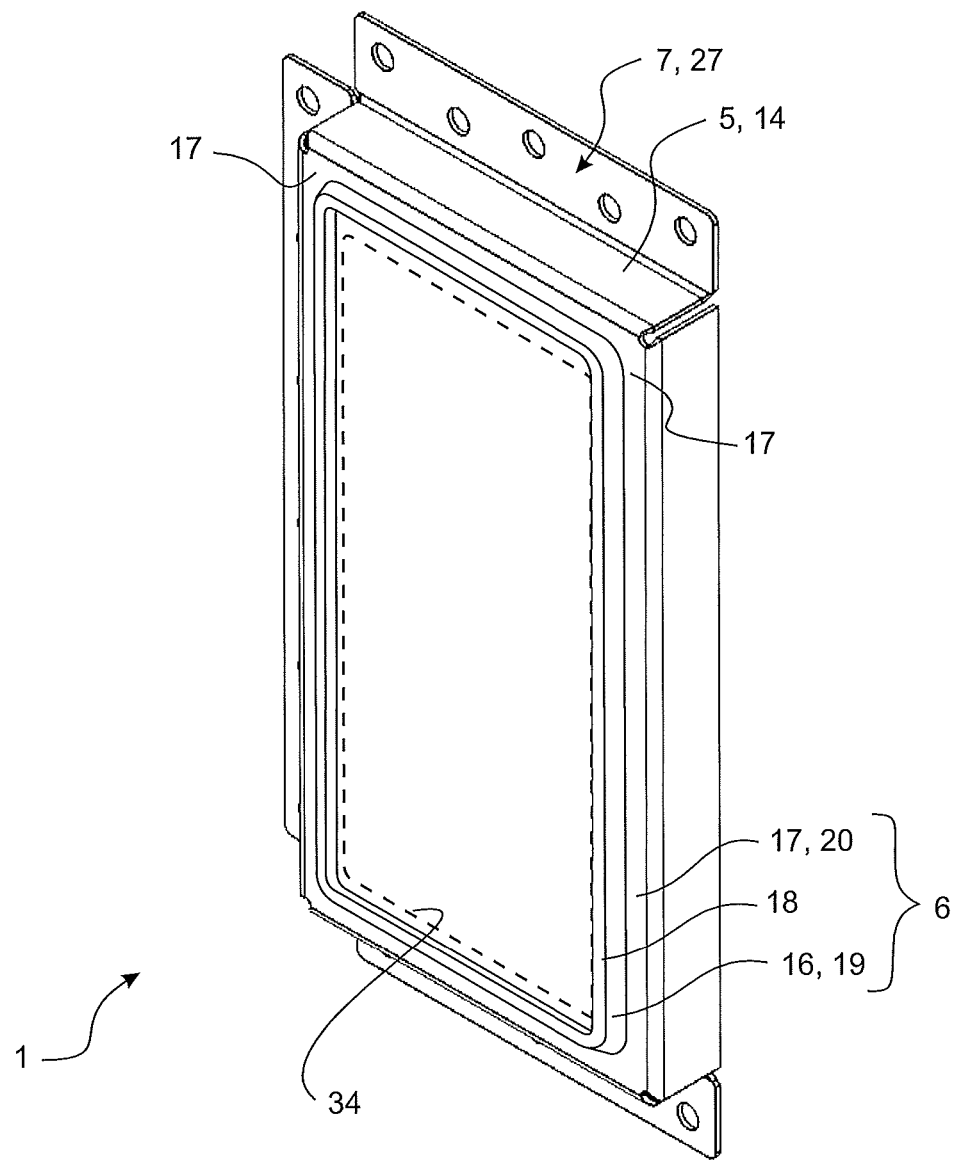
FIG. 20 is yet a further embodiment of this invention in which a snap-out or frangible central recessed region may be removed to reveal a body with a rim and an inner side wall.

With reference to FIG. 20, a body 1 is provided in which a recessed region and a rim are provided, with a centralised recessed region acting as a plug for a total enclosure of an existing aperture. Again, the perforated line indicates a portion where a frangible section 34 may be provided to allow a user to thereby remove the central recessed region and leave open the body 1 for providing an inner aperture.

With each of the embodiments described and shown here, the various flange portions and other parts of the body 1, and in particular with reference to the rear face 7 provides for at least one support surface 27, at least a part of these portions may be removed, either along a frangible line section or by a user so as to allow a body 1 to be best fitted to a building panel, or for being customised where for example a body 1 is to be situated adjacent a framing member or another obstruction caused as part of a building (e.g. wooden framing or steel framing or an electrical component which is not able to be moved).

Those embodiments shown by FIGS. 1-12 may have particular application to, though are not limited to, ceiling or wall light fitting sockets, for example light fittings or ventilation ducting or other apertures may in such building panels which may need to be re-sized or re-oriented or have their geometry varied.

Those embodiments shown by FIGS. 17A-20 may have particular application to, though are not limited to, wall sockets, for example electrical or data outlet sockets which may need to be re-sized or re-oriented or have their geometry varied.

The foregoing description of the invention includes preferred forms thereof. Modifications may be made thereto without departing from the scope of the invention.

The invention claimed is:
1. A body defining an aperture to be formed in a panel, the body comprising:
  an inner surface,
  an outer surface,
  a front face, and
  a rear face,
  the aperture to be formed relative to an existing aperture through a panel, wherein the inner surface provides for an inner side wall of the aperture to be formed, the panel having a thickness defined between a first face and a second face, and the panel having an existing aperture side wall as defined by the existing aperture and extending between the first and second faces of the panel, the outer surface comprising an outer side wall of the, or at least a part of the, aperture to be formed and/or of the existing aperture to be varied in geometry, the outer side wall to be, at least in part, located substantially adjacent to the existing aperture side wall, the rear face provides for at least one support surface to be located upon a region of the second face of the panel surrounding the existing aperture, and wherein the inner side wall terminates with at least one rim on the front face, the front face comprising one or more recessed regions and each rim having a rim surface, the rim surface being a surface projected from at least one of the one or more recessed regions so as to provide a reference surface, referenced relative to the first face of the panel, and the front face comprising a plurality of associated recessed regions each having an associated rim, each said rim having an associated rim surface, each of said associated rim surfaces projecting from a respective associated recessed region, and each rim being associated at least in part with an associated inner side wall or a part of an inner side wall, wherein one or more of the plurality of associated recessed regions and/or the associated rim, or an associated recessed region and an associated rim, is/are separately connectable to or disconnectable from the body, and wherein when the body is located in-situ in an existing aperture, the rear face is located upon the second face of the panel supports the body.

2. The body as claimed in claim 1, wherein the body is to be located within the existing aperture of the panel for reducing the size or altering the shape or geometry of the existing aperture.

3. The body as claimed in claim 1, wherein the rim surface is substantially planar with the first face of the panel, when said rear face is located upon the second face of the panel.

4. The body as claimed in claim 1, wherein the rim surface is a substantially planar surface.

5. The body as claimed in claim 1, wherein the recessed region is recessed relative to the rim surface.

6. The body as claimed in claim 1, wherein the recessed region is a surface recessed from the first face of the panel, when said rear face is located upon the second face of the panel.

7. The body as claimed in claim 1, wherein each rim surface provides for a reference surface, referenced relative to the first face of the panel.

8. The body as claimed in claim 1, wherein each rim is associated at least in part with an associated inner side wall or a part of an inner side wall.

9. The body as claimed in claim 1, wherein a connection system is provided between a first of an associated recessed region and an associated rim and a second of an associated recessed region and an associated rim, the connection system allowing for a connection or disconnection to or from the body of one or more associated recessed regions with an associated rim or one or more associated recessed regions.

10. The body as claimed in claim 9, wherein the connection system is a frangible connection provided between a first of an associated recessed region and an associated rim and a second of an associated recessed region and an associated rim, the frangible connection allowing for disconnection or removal of a recessed region and a rim from the body.

11. The body as claimed in claim 10, wherein the frangible connection is located between an inner side wall of the first associated recessed region with the first associated rim and the second recessed region with the second associated rim.

12. The body as claimed in claim 10, wherein the frangible connection allows for a disconnection or removal of at least one associated region and associated rim from another associated region and associated rim.

13. The body as claimed in claim 9, wherein the connection system allows for a snap-in or snap-fit connection for connecting one or more associated recessed regions with an associated rim and an inner side wall to the body or to one or more associated recessed regions with an associated rim and an inner side wall.

14. The body as claimed in claim 9, wherein the plurality of associated recessed regions and associated rims with associated inner side walls are concentric.

15. The body as claimed in claim 1, wherein a plurality of associated recessed regions and/or associated rim form the front face of the body.

16. The body as claimed in claim 1, wherein the front face comprises a series or sequence of sets of associated recessed regions and associated rims each with an associated inner side wall, whether removable from or connectable to the body, each set providing geometry.

17. The body as claimed in claim 1, wherein there is a concentric series of associated recessed regions and associated rims with associated inner side walls.

18. The body as claimed in claim 1, wherein the front face comprises a central recessed region, (optionally) surrounded by a rim that is associated with a different recessed region and a different side wall.

19. The body as claimed in claim 1, wherein the portions of the body or the recessed region, comprise one or more surface reliefs.

20. The body as claimed in claim 19, wherein the surface reliefs is one or more of: surface texturing, undulations or an undulating surface, perforations, indentations, cut-outs or slits or slots.

21. The body as claimed in claim 1, wherein the rear face is or comprises at least one flanged portion extending outwardly from the outer surface.

22. The body as claimed in claim 21, wherein the flanged portion(s) extend(s) outwardly so as to be supported upon the region of the second face surrounding the existing aperture.

23. The body as claimed in claim 1, wherein the body is formed by one or more components, said one or more components are inter-connectable so as to form the body.

24. The body as claimed in claim 1, wherein the one or more components are inter-connectable by a hinged joint.

25. The body as claimed in claim 24, wherein a single hinged joint connects two components together form the body as a whole.

26. The body as claimed in claim 23, wherein the components are inter-connectable is via a male part of one component to be received by a female part of another component.

27. The body as claimed in claim 1, wherein the inner side wall surface comprises a channel or a plurality of channels, (optionally) the channel(s) is/are shaped so as to receive a fitting or fittings of a component to be inserted or located within the aperture defined by the body.

28. The body as claimed in claim 1, wherein the aperture defined by the body is selected from: circular, oval or elongated in shape, rectilinear, square, rectangular, geometric in shape.

29. The body as claimed in claim 1, wherein the body or components of the body is/are a pre-form.

30. The body as claimed in claim 1, wherein the body is formed of one or any combination of: fibrous plasters such as compositions comprising gypsum, polymers, metals, compositions comprising fibrous reinforcement, including cementitious fibre reinforced materials, fibre-glass materials.

31. The body as claimed in claim 1, wherein the body is formed of a polymer, such as, but not limited to: thermoplastics, thermosetting polymers, polyethylene (PE), polypropylene (PP), polyethylene terephthalate (PET), or others which have suitable characteristics for a particular use or installation situation.

32. The body as claimed in claim 1, wherein the body is formed of materials or treated, so as to be, or comprises of: an electrically conductive component, an anti-static component, an electrically insulating component, a fire resistant component, a fire retardant component, or a self-extinguishing component material.

33. The body as claimed in claim 1, wherein the outer side wall of the body or the rear face, or both, comprise an adhesive for adhesively engaging with the panel.

34. The body as claimed in claim 33, wherein the adhesive includes a removable backing, which upon removal exposes an adhesive for engagement with the panel.

* * * * *